(12) United States Patent
Shumkov et al.

(10) Patent No.: US 10,763,748 B2
(45) Date of Patent: Sep. 1, 2020

(54) BUCK-BOOST DC-DC CONVERTER

(71) Applicant: Texas Instruments Incorporated, Dallas, TX (US)

(72) Inventors: Ivan Shumkov, Freising (DE); Erich Bayer, Thonhausen (DE); Joerg Kirchner, Mauern (DE); Ruediger Ganz, Freising (DE); Michael Lueders, Munich (DE); Martin Priess, Freising (DE); Nicola Rasera, Unterschleissheim (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/995,331

(22) Filed: Jun. 1, 2018

(65) Prior Publication Data

US 2019/0052173 A1 Feb. 14, 2019

Related U.S. Application Data

(63) Continuation of application No. 15/672,429, filed on Aug. 9, 2017, now Pat. No. 10,014,777.

(51) Int. Cl.
*H02M 3/158* (2006.01)

(52) U.S. Cl.
CPC ................ *H02M 3/1582* (2013.01)

(58) Field of Classification Search
None
See application file for complete search history.

(56) References Cited

U.S. PATENT DOCUMENTS

| | | | | |
|---|---|---|---|---|
| 7,378,823 B2* | 5/2008 | Yamanaka | ............... | H02J 1/08 |
| | | | | 323/222 |
| 8,436,592 B2 | 5/2013 | Saitoh | | |
| 8,975,879 B2* | 3/2015 | Xu | ............... | H02M 3/158 |
| | | | | 323/259 |
| 9,024,593 B2* | 5/2015 | Keller | ............... | H02M 7/48 |
| | | | | 323/222 |
| 9,413,239 B2 | 8/2016 | Prexl et al. | | |

(Continued)

*Primary Examiner* — Jue Zhang
*Assistant Examiner* — David A. Singh
(74) *Attorney, Agent, or Firm* — Lawrence J. Bassuk; Charles A. Brill; Frank D. Cimino

(57) ABSTRACT

Disclosed examples include inverting buck-boost DC-DC converter circuits with a switching circuit to alternate between first and second buck mode phases for buck operation in a first mode, including connecting an inductor and a capacitor in series between an input node and a reference node to charge the inductor and the capacitor in the first buck mode phase, and connecting the inductor and the capacitor in parallel between an output node and the reference node to discharge the inductor and the capacitor to the output node. For boost operation in a second mode, the switching circuit alternates between connecting the inductor and the capacitor in series between the input node and the reference node to discharge the inductor and charge the capacitor in a first boost mode phase, and connecting the inductor between the input node and the reference node to charge the inductor and connecting the capacitor between the first output node and the reference node to discharge the capacitor to deliver power to the output node in a second boost mode phase.

16 Claims, 16 Drawing Sheets

(56) References Cited

U.S. PATENT DOCUMENTS

| | | | |
|---|---|---|---|
| 2001/0004205 A1* | 6/2001 | Miller | H02J 7/1423 323/224 |
| 2003/0001547 A1* | 1/2003 | Jurzitza | H02M 3/1582 323/225 |
| 2003/0002154 A1 | 1/2003 | Jurzitza | |
| 2004/0257308 A1* | 12/2004 | Yang | G09G 3/2965 345/63 |
| 2006/0221649 A1 | 10/2006 | Yamanaka et al. | |
| 2007/0075689 A1 | 4/2007 | Kinder et al. | |
| 2007/0210782 A1 | 9/2007 | Prexl et al. | |
| 2008/0055946 A1* | 3/2008 | Lesso | H02M 3/158 363/63 |
| 2008/0158915 A1* | 7/2008 | Williams | H02M 3/07 363/21.06 |
| 2009/0167264 A1 | 7/2009 | Bayer et al. | |
| 2009/0206772 A1* | 8/2009 | Bayer | H02M 3/1582 315/294 |
| 2010/0039080 A1* | 2/2010 | Schoenbauer | H02M 3/1582 323/234 |
| 2011/0089993 A1 | 4/2011 | Shumkov et al. | |
| 2011/0156683 A1 | 6/2011 | Zhang et al. | |
| 2012/0032664 A1* | 2/2012 | Coleman | H02M 3/158 323/311 |
| 2012/0126777 A1* | 5/2012 | Motegi | H02M 3/1582 323/311 |
| 2012/0274295 A1* | 11/2012 | Lin | H02M 3/1582 323/282 |
| 2012/0262437 A1 | 12/2012 | Keller et al. | |
| 2013/0300383 A1 | 11/2013 | Bayer | |
| 2013/0320949 A1 | 12/2013 | Prexl et al. | |
| 2014/0268946 A1* | 9/2014 | Liu | H02M 3/07 363/60 |
| 2017/0040898 A1* | 2/2017 | Hong | H02M 3/1582 |
| 2017/0179895 A1 | 6/2017 | King et al. | |
| 2017/0271987 A1* | 9/2017 | Yu | H02M 3/1582 |
| 2017/0271990 A1* | 9/2017 | Knoedgen | H02M 3/158 |
| 2017/0279354 A1* | 9/2017 | Lueders | H02M 3/158 |

* cited by examiner

BUCK-BOOST DC-DC CONVERTER

CROSS REFERENCE TO RELATED APPLICATIONS

Under 35 U.S.C. § 120, this continuation application claims benefits of and priority to U.S. patent application Ser. No. 15/672,429 (TI-77412), filed on Aug. 9, 2017, the entirety of which are hereby incorporated herein by reference.

BACKGROUND

DC-DC converters are switched mode power supplies (SMPS) used in a variety of circuits to provide a DC output signal by converting a DC input signal. The input and output signals can be of the same or opposite polarities. A variety of different DC-DC converter topologies are available, including isolated and non-isolated supplies. Non-isolated SMPS converters include buck, boost, buck-boost, Cuk and other types. Conventional buck-boost DC-DC converters can operate to deliver output voltages above or below the voltage of the input signal, in contrast to buck converters in which the output voltage is less than or equal to the input voltage, or boost converters where the output voltage is greater than or equal to the input voltage.

However, switching transistors in conventional buck-boost converters are exposed to voltages equal to the sum of the input voltage and the absolute value of the output voltage. In particular, the voltage swing on a switching node, and the voltage across the inductor of a standard two transistor inventing buck-boost converter, are higher than the switch and inductor voltages of buck or boost converters.

The inductor voltage is approximately equal to the input voltage during the on time of the output transistor (the Ton phase), and is approximately equal to the output voltage during the output transistor off time (the Toff phase). Higher inductor voltages lead to larger ripple currents that cause higher inductive switching losses. At the same time, the buck-boost converter switching transistors must be larger than buck or boost converter transistors to accommodate the higher voltage amplitudes. As a result, the larger switching transistors lead to higher switching losses. Thus, while buck-boost converters generally provide more flexibility with respect to output voltage levels, conventional buck-boost converters suffer from lower output current to average inductor current ratios and higher inductor losses compared to buck or boost converters. Consequently, conventional buck-boost converts have lower efficiency, particularly for extreme duty cycle operation.

SUMMARY

Disclosed examples include buck-boost DC-DC converter circuits and DC-DC conversion methods. A buck-boost converter (switcher) includes a control circuit and a switching circuit. The buck-boost converter can be coupled to an external buck-boost inductor and an external flying capacitor to for a switched mode power supply (SMPS). In one example, the switching circuit includes five transistors to provide a single-ended inverting output voltage signal VOUT, where only one of the transistors is exposed to voltages equal to the sum of the input voltage and the absolute output voltage value. The transistors form two dual transistor leg circuits joined by the series combination of the external buck-boost inductor and the flying capacitor. A fifth transistor connects the capacitor and inductor to a reference node. A sixth transistor can be included in the switching circuit for a bipolar output implementation providing VOUT+ and VOUT−. The control circuit operates the switches to implement a first mode for buck operation and a second mode for boost operation. In the first mode, the switching circuit alternates between first and second buck mode phases. In the first buck mode phase, the switching circuit connects the inductor and the capacitor in series between an input node and a reference node to charge the inductor and the capacitor. In the second buck mode phase, the switching circuit connects the inductor and the capacitor in parallel between an output node and the reference node to discharge the inductor and the capacitor to deliver power to the output node.

For boost operation in the second mode, the switching circuit alternates between first and second boost mode phases. In the first boost mode phase, the switching circuit connects the inductor and the capacitor in series between the input node and the reference node to discharge the inductor and charge the capacitor. In the second boost mode phase, the switching circuit connects the inductor between the input node and the reference node to charge the inductor and connects the capacitor between the first output node and the reference node to discharge the capacitor to deliver power to the output node. In certain examples, the switching circuit operates in a third mode for buck-boost operation by sequentially transitioning through three buck-boost mode phases to change operation of the DC-DC converter circuit between the first and second modes. In certain examples, the control circuit switches operation between the first, second and third modes according to a feedback signal and a clock signal.

A method is disclosed for switched mode conversion of a DC input voltage signal from an input node to provide a DC output voltage signal, the method useable in a switched mode power supply that includes a buck-boost inductor and a flying capacitor. The method includes alternating between first and second buck mode phases in a first mode when the input voltage signal is greater than an absolute value of the output voltage signal. The first buck mode phase includes connecting the inductor and the capacitor in series with one another between the input node and a reference node to charge the inductor and the flying capacitor. The second buck mode phase includes connecting the inductor and the capacitor in parallel between the first output node and a reference node to discharge the inductor and the capacitor to deliver power to the first output node. The method further includes alternating between first and second boost mode phases in a second mode when the input voltage signal is less than the absolute value of the output voltage signal. The first boost mode phase includes connecting the inductor and the capacitor in series with one another between the input node and the reference node to discharge the inductor and charge the capacitor. The second boost mode phase includes connecting the inductor between the input node and the reference node to charge the inductor, and connecting the capacitor between the first output node and the reference node to discharge the capacitor to deliver power to the first output node.

DETAILED DESCRIPTION

Figure 1:
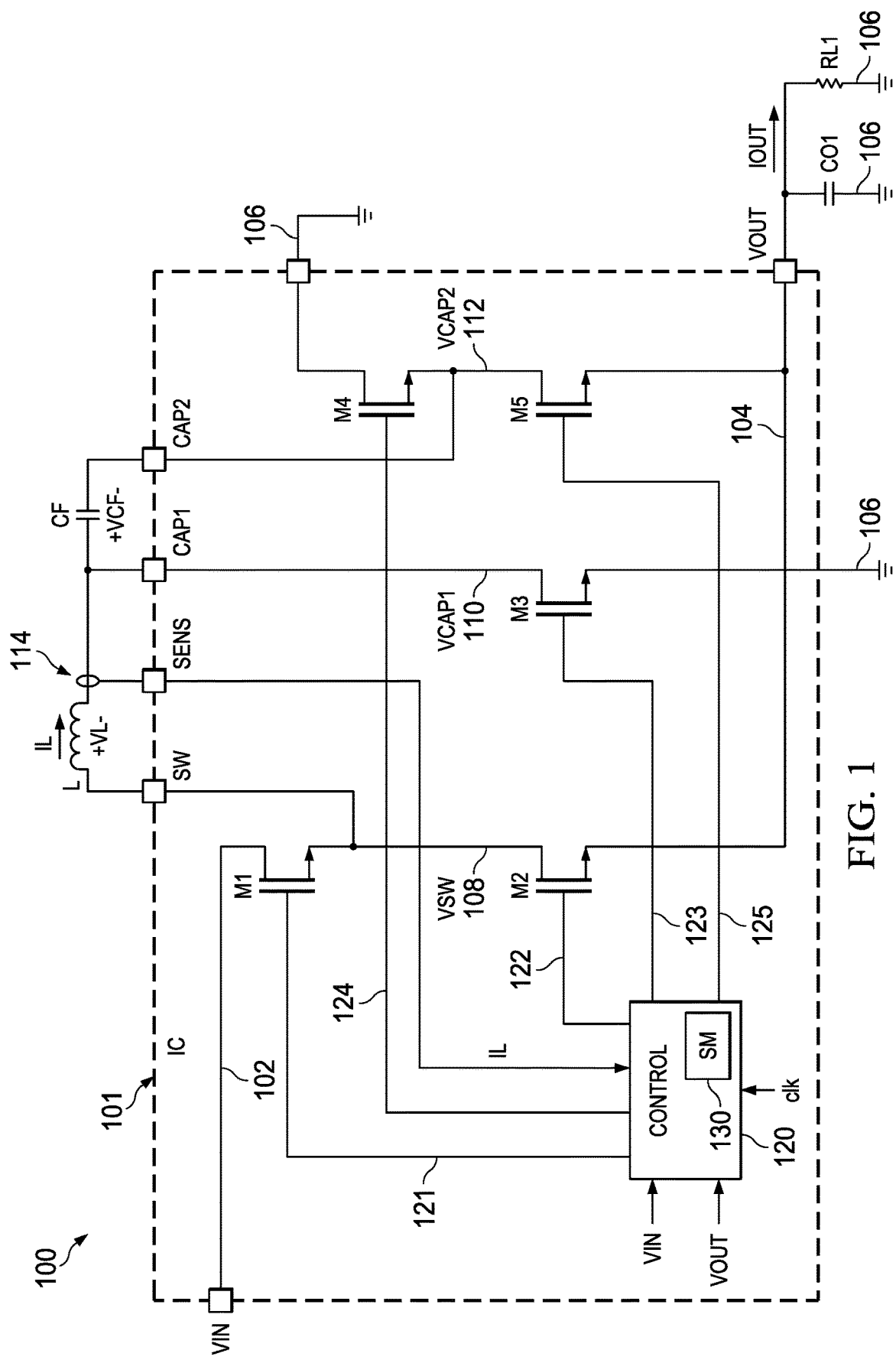
FIG. 1 is a schematic diagram of an example five switch buck-boost DC-DC converter circuit, providing regulated VOUT, the buck-boost converter (including a controller and a switch network) for use in a switched mode power supply (SMPS) including an external buck-boost inductor and an external flying capacitor.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . ." Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Figure 2:
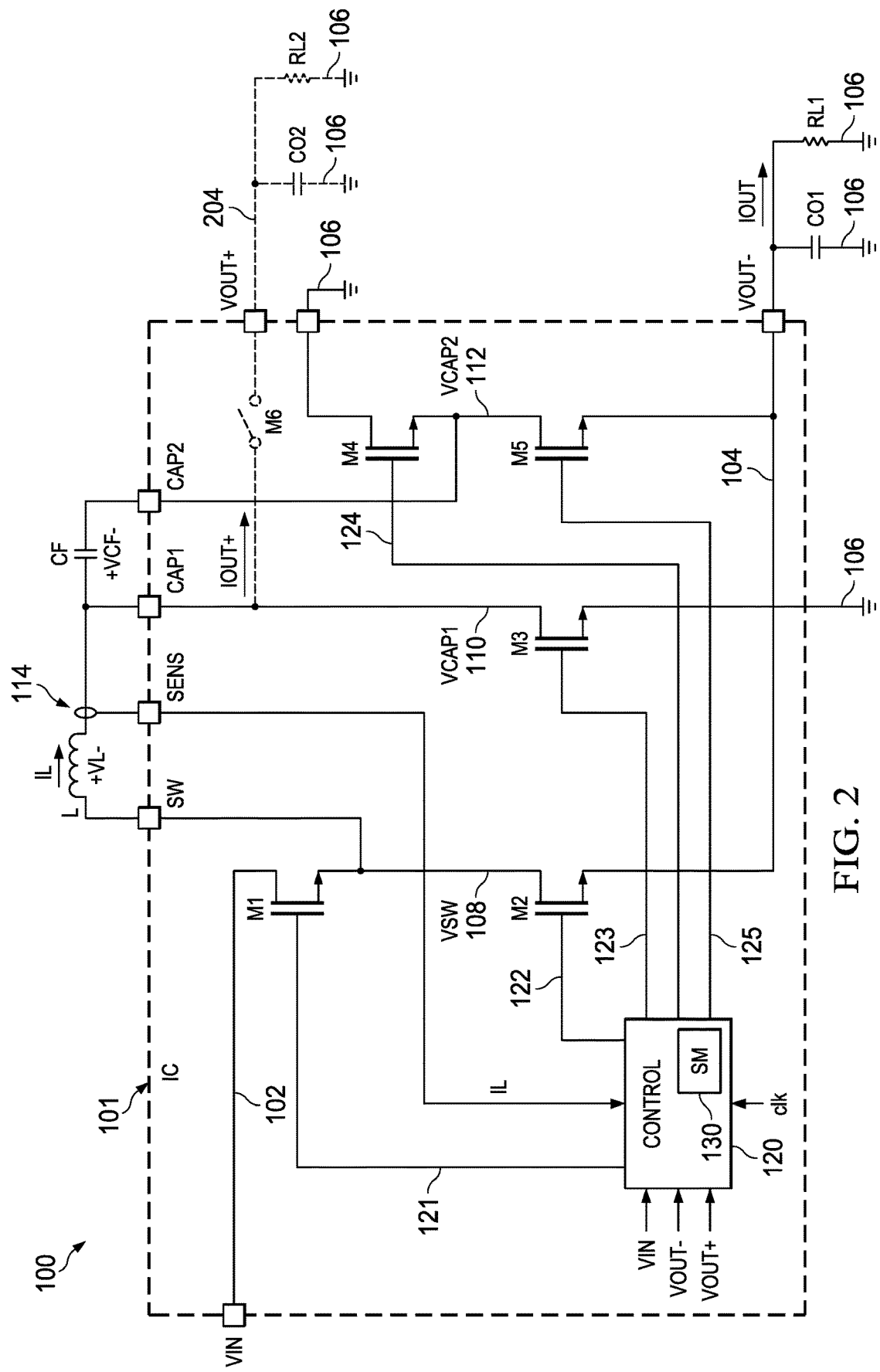
FIG. 2 is a schematic diagram of an example six switch bipolar split supply buck-boost DC-DC converter circuit, providing regulated VOUT+ and VOUT−, the bipolar buck-boost converter (including a controller and a switch network) for use in a switched mode power supply (SMPS) including an external buck-boost inductor and an external flying capacitor.

Referring initially to FIGS. 1 and 2, FIG. 1 shows a five switch, single-ended buck-boost converter 100 that implements an inverting DC-DC converter circuit to convert an input voltage signal VIN to provide a single-ended output voltage signal VOUT. The buck-boost converter 100 includes an input node (terminal) 102 to receive the input voltage signal VIN and a first output node (terminal) 104 to provide the output voltage signal VOUT. The first output node 104 provides a first output voltage signal VOUT that is negative relative to a reference node 106 at a ground or common reference potential by converting a positive input signal VIN, although input-output polarity inversion is not a strict requirement of all examples. The circuit in FIG. 1 provides a single first output signal VOUT at the first output node 104. FIG. 2 shows a bipolar buck-boost DC-DC converter circuit 100 with two output nodes 104 and 204 to provide a bipolar split supply output VOUT−, VOUT+.

The single-ended buck-boost converter 100 of FIG. 1, and the bipolar (split supply) buck-boost converter 100 of FIG. 2, are for use in a switched mode power supply (SMPS) including an external buck-boost inductor L, and, according to aspects of this disclosure, an external flying capacitor CF, Inductor L and capacitor CF are connected at an intermediate node 110, and are coupled to the buck-boost converter 100 (FIGS. 1 and 2) through nodes (terminals) SW, CAP1 and CAP2. The buck-boost converters 100 of FIGS. 1 and 2 can be implemented as an SMPS module that incorporates the inductor L and capacitor CF.

The single-ended buck-boost converter 100 in FIG. 1 includes a switching circuit with transistor switches M1-M5 and the control circuit 120. Any suitable switches can be used, such as field effect transistors, bipolar transistors or other semiconductor-based switches operable according to corresponding switching control signals from the control circuit 120. In the example of FIG. 1, the switches M1-M5 are NMOS transistors with gate control terminals to receive switching control signals. The control circuit 120 includes outputs 121, 122, 123, 124 and 125 that provide switching control signals to the gates of the transistors M1-M5 according to a state machine 130. The control circuit 120 can be any suitable logic circuit with suitable driver circuitry to implement the switch control functions described herein. In certain examples, the control circuit 120 may be programmed or programmable, although programmability is not a strict requirement of all possible implementations. The buck-boost converter 100 can be implemented as a controller integrated circuit 120, providing switch control inputs to an external switch network (e.g., switches M1-M5), the switch network coupled to the external buck-boost inductor L and flying capacitor CF. In another non-limiting example, an integrated circuit 101 includes a switching circuit as well as a control circuit 120, with suitable terminals (e.g., pins or pads) allowing electrical interconnection for input and output voltage signals, ground fault common reference connections, as well as the terminals for connection to an external inductor L and/or an external capacitor CF. In certain examples, moreover, one or both of the inductor L and/or the capacitor CF can be incorporated into an integrated circuit that also includes one or more of the converter switches and/or a control circuit 120. In further non-limiting examples, one or more of the switches can be external to the IC 101.

FIG. 1 illustrates one example in which an integrated circuit 101 includes the control circuit 120 as well as transistors M1-M5. This example includes IC terminals for connecting an external inductor L as well as an external capacitor CF. The IC 101 in FIG. 1 also includes a separate terminal for connection of a sense signal to indicate a current flowing through the inductor.

The switching circuit is coupled to the input node 102, and the first output node 104, and to the nodes that connect to the external buck-boost inductor L and flying capacitor CF. In the illustrated example, the IC 101 includes a first switching node terminal SW connected to the first switching node 108, and the first switching node terminal SW allows electrical connection to a first terminal of an external buck-boost inductor L. In addition, the illustrated IC 101 includes a first capacitor terminal CAP1 connected to the intermediate node 110, and the terminal CAP1 allows electrical connection to a second terminal of the inductor L, and to a first terminal of the capacitor CF. The illustrated IC 101 also includes a second capacitor terminal CAP2 connected to a second switching node 112, which allows electrical connection to a second terminal of the external capacitor CF.

The converter IC 101 includes a pair of transistors M1 and M2 connected in series with one another to form a first circuit branch or leg circuit between the input and output nodes 102 and 104. The first transistor M1 includes a gate connected to the control circuit output 121, a drain connected to the input node 102 and a source connected to a first switching node 108 connected to a first switching node (terminal) SW, with a first switching node voltage VSW at the first switching node terminal designated SW. The second transistor M2 includes a gate connected to the control circuit output 122, a drain connected to first switching node 108 connected to the first switching node terminal SW, and a source connected to the first output node 104. A second pair of transistors M4 and M5 is connected in series with one another to form a second branch or circuit leg circuit between the reference node 106 and the first output node 104. The fourth transistor M4 includes a gate connected to the control circuit output 124, a drain connected to the reference node 106 and a source connected to a second switching node 112 connected to node (terminal) CAP2. The fifth transistor M5 includes a gate connected to the control circuit output 125, a drain connected to the second switching node 112 and a source connected to the first output node 104. For the buck-boost converter 100 of FIGS. 1, M4 and M5 can be replaced by diodes.

The buck-boost converter 100 is coupled to the (external) buck-boost inductor L connected between the first switching node (terminal SW), connected to the first switching node 108 between with a first inductor terminal connected to the first switching node (terminal) SW connected to the first switching node 108 and a second inductor terminal connected through the intermediate node 110 to the (external) flying capacitor CF. In operation, the inductor L conducts an inductor current designated IL in FIG. 1, and the inductor L has an inductor voltage designated VL.

The control circuit 120 receives from a current sensor 114, through a sense node (terminal) SENS, an inductor current feedback signal. In certain examples, the inductor current IL is sensed by measuring the voltage drop across one or more of the transistors M1-M5 of the switching circuit. The control circuit 120 in certain examples compares the measured current IL with a threshold to detect whether the current IL has reached a predetermined peak threshold value Ipeak. The control circuit 120 also receives further feedback signals including the input voltage VIN and the output voltage VOUT through appropriate feedback connections (not shown). In certain examples, the control circuit 120 receives a clock signal clk for timing control to implement a continuous series of converter cycles for closed loop control and regulation of the output voltage VOUT according to an internal or external setpoint value.

The capacitor CF is connected in series with the inductor L between the intermediate node 110, connected to the CAP1 node (terminal), and the second switching node 112 (CAP2 terminal). The second switching node 112 joins the transistors M4 and M5. The capacitor CF operates as a flying capacitor to control the inductor voltage. The capacitor CF has an associated capacitor voltage VCF, with the voltage at the intermediated node 110 connected to the CAP1 terminal designated as VCAP1, and the voltage at the CAP2 terminal connected to the second switching node 112 designated as VCAP2 in FIG. 1. The switching circuit also includes a third transistor M3 with a gate connected to the control circuit output 123, a drain connected to the CAP1 terminal, connected to the intermediate node 110, and a source connected to the reference node 106.

The first output node 104 provides the output voltage signal VOUT to drive an external load, shown as a resistor RL1 in FIG. 1, to conduct an output current IOUT. An output capacitor CO1 can be coupled in parallel with the load RL.

The bipolar (split supplies) example in FIG. 2 includes a bipolar buck-boost converter 100 coupled to first and second loads RL1 and RL2, as well as first and second output capacitors CO1 and CO2. The bipolar buck-boost converter 100 in FIG. 2 provides first and second voltage output signals VOUT− and VOUT+ and corresponding output current signals IOUT−, IOUT+ at the corresponding output nodes (terminals) 104 and 204.

For the bipolar buck-boost converter 100 of FIG. 2, M4, M5 and M6 can be replaced by diodes.

For bipolar boost converter applications where VIN<|VOUT|, the switches M1 and M2 can be removed from the converter 100 of FIG. 2 and the inductor L can be directly connected to the input node 102 to provide a four switch (M3-M6) boost converter topology.

Figure 3:
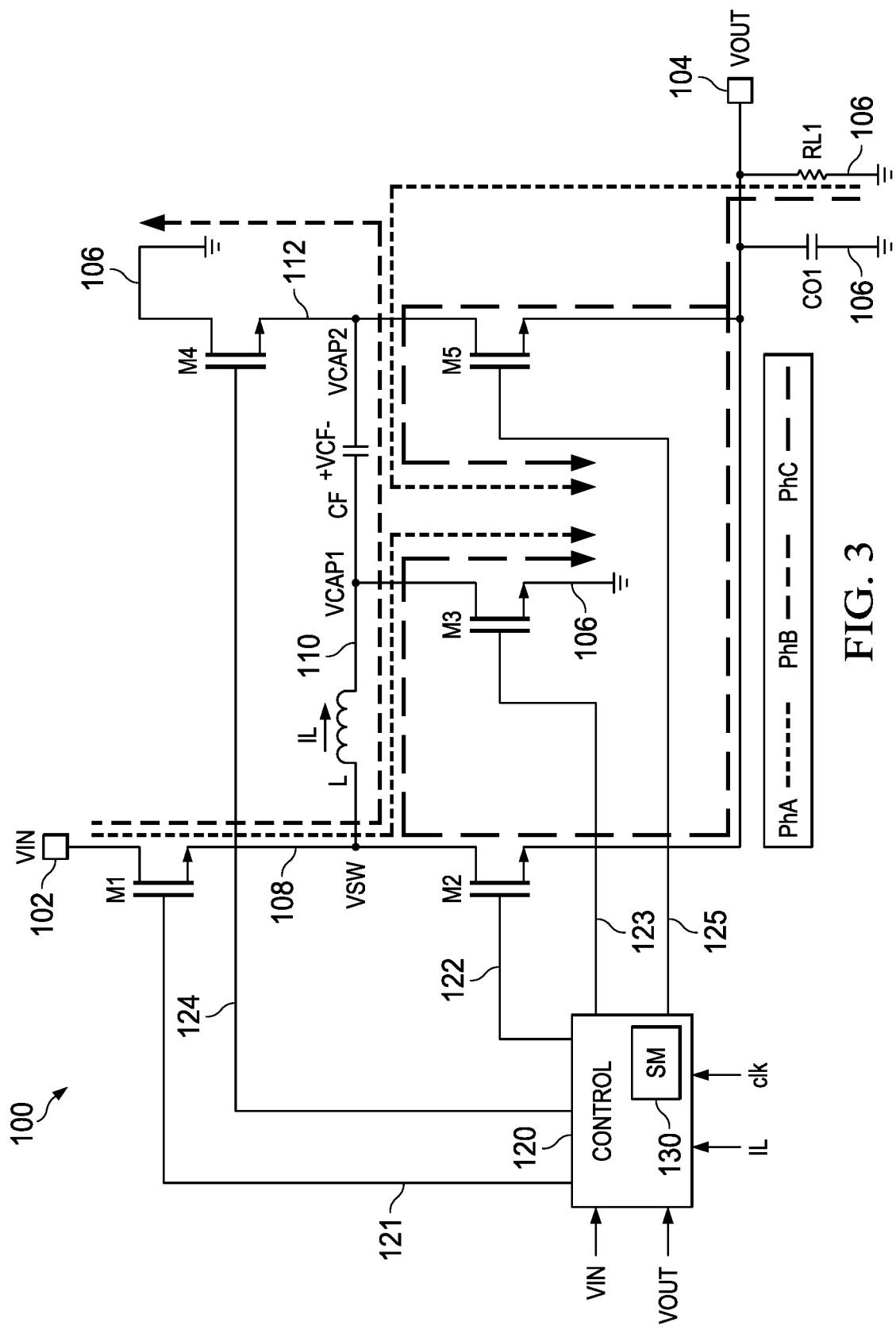
FIG. 3 is a schematic diagram of the buck-boost converter of FIG. 1 showing three different operating phases.

FIG. 3 shows three possible operating phases in the buck-boost converter 100, including dashed-lines showing current flow paths for three example phases PhA, PhB and PhC. The switching circuit operates according to the switching control signals provided at the outputs 121-125 of the control circuit 120 to implement two or more distinct phases PhA, PhB and PhC in each of two or three operating modes in each converter cycle. This operation provides a first mode (BUCK) for buck operation when the input voltage signal VIN is greater than the absolute value |VOUT| of the output voltage signal VOUT and a second mode (BOOST) for boost operation when the input voltage signal VIN is less than the absolute value |VOUT|. In certain implementations, the switching circuit operates in a third mode (BUCK-BOOST) for buck-boost operation when VIN is within a non-zero pre-defined range of |VOUT|. In the first mode, the control circuit state machine 130 alternates operation between first and second buck mode phases PhB and PhC, respectively. In the second mode, the state machine 130 alternates operation between first and second boost mode phases PhB and PhA, respectively. In the third (buck-boost) mode, the control circuit state machine 130 sequentially transitions through first, second and third buck-boost mode phases PhB, PhA and PhC.

In one example, the switching signals and the corresponding switch states for phase PhA are the same for the second and third modes. During the PhA operation, the control circuit 120 turns the transistors M1, M3 and M5 on and turns M2 and M4 off. In this state, the inductor L is connected between the input node 102 and the reference node 106 and the capacitor CF is connected between the first output node 104 and the reference node 106. The switching signals and the corresponding switch states for PhB are the same for the first, second and third modes. In this state, the control circuit 120 turns the transistors M1 and M4 on and turns M2, M3 and M5 off. This connects the inductor L and the capacitor CF in series with one another between the input node 102 and the reference node 106. The switching signals and the corresponding switch states for PhC are the same for the first and third modes. In the phase PhC, the control circuit 120 turns M2, M3 and M5 on and turns M1 and M4 off. This state connects the inductor L and the capacitor CF in parallel between the first output node 104 and the reference node 106.

In operation, the control circuit 120 provides switching control signals of appropriate levels at the outputs 121-125 to turn the switch transistors M1-M5 on and off to implement various switching states according to a current operating mode. In one example, the transistors M1-M5 are NMOS transistors and the control circuit 120 provides active high switching control signals to turn individual ones of the transistors M1-M5 on, and low switching control signals to turn the corresponding transistor off. For buck operation in the first mode, the control circuit 120 provides signals at the outputs 121-125 to alternate switching circuit operation between the first and second buck mode phases PhB and PhC. In the illustrated example, moreover, each converter cycle begins with operation in the phase PhB, although not a strict requirement of all possible implementations. In the first mode (BUCK), the control circuit 120 implements the individual control cycles from clock to clock based on the clock signal clk. Similarly, in the third mode (BUCK-BOOST), the control cycles extend from clock to clock. The second mode (BOOST) in one example includes control cycles extending from a maximum time Tmax to a subsequent time Tmax, where Tmax in one example is (0.8 or 0.9)*Tsw, and the switching cycle period Tsw starts with a rising edge of the clk signal.

Various concepts are described below in the context of the single-ended inverting buck-boost converter circuit 100 of FIG. 1. The following description is also applicable to bipolar implementations, for example, as shown in FIG. 2. In particular, the bipolar implementations include the sixth transistor switch M6, which is turned on in the PhB phase of the first, second and third modes. In certain bipolar converter implementations, moreover, the control circuit 120 turns M6 off before turning the first and fourth transistors M1 and M4 off.

Figure 4:
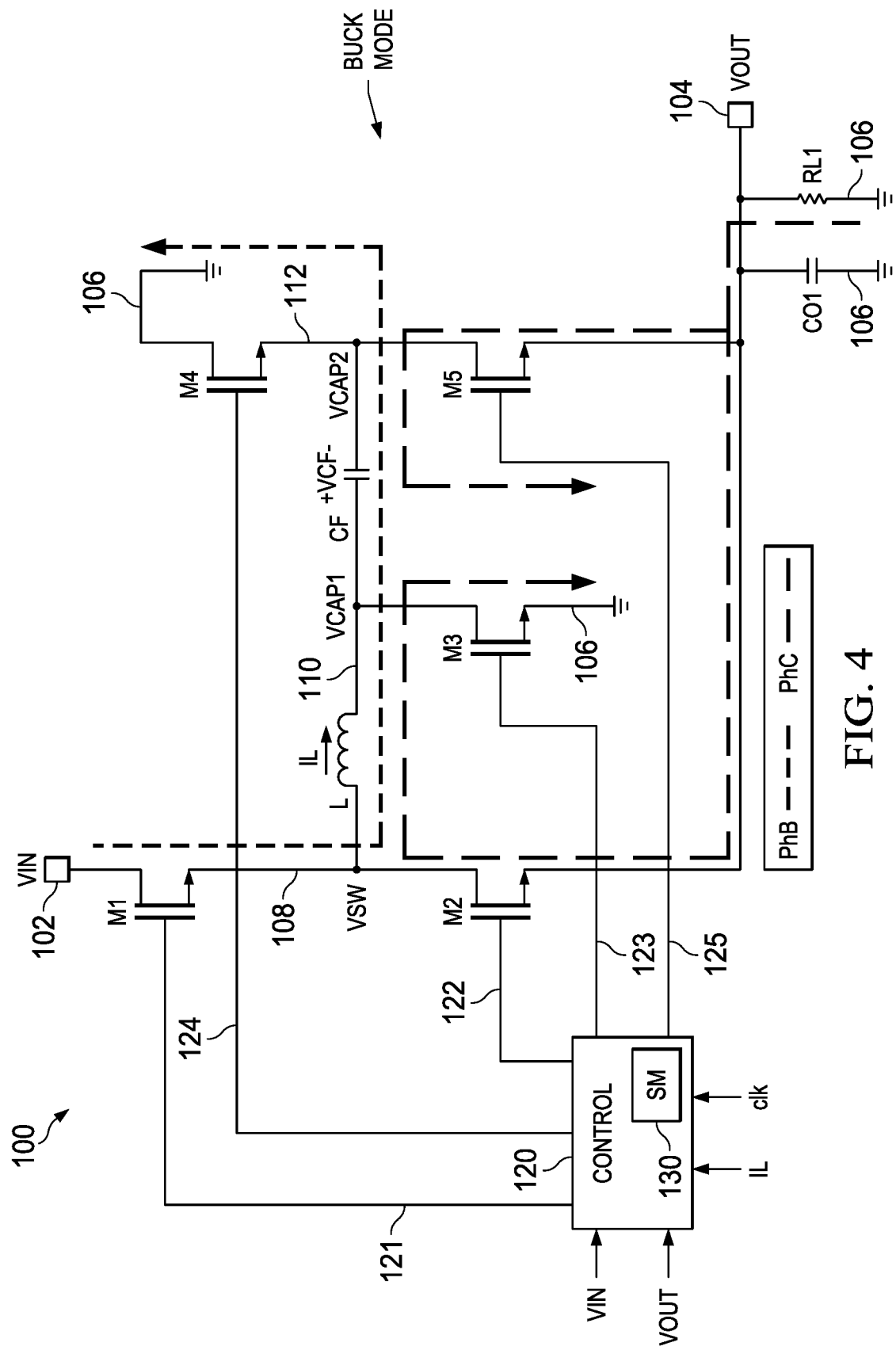
FIG. 4 is a schematic diagram of the buck-boost converter of FIG. 1 alternating between two buck mode phases.
Figure 5:
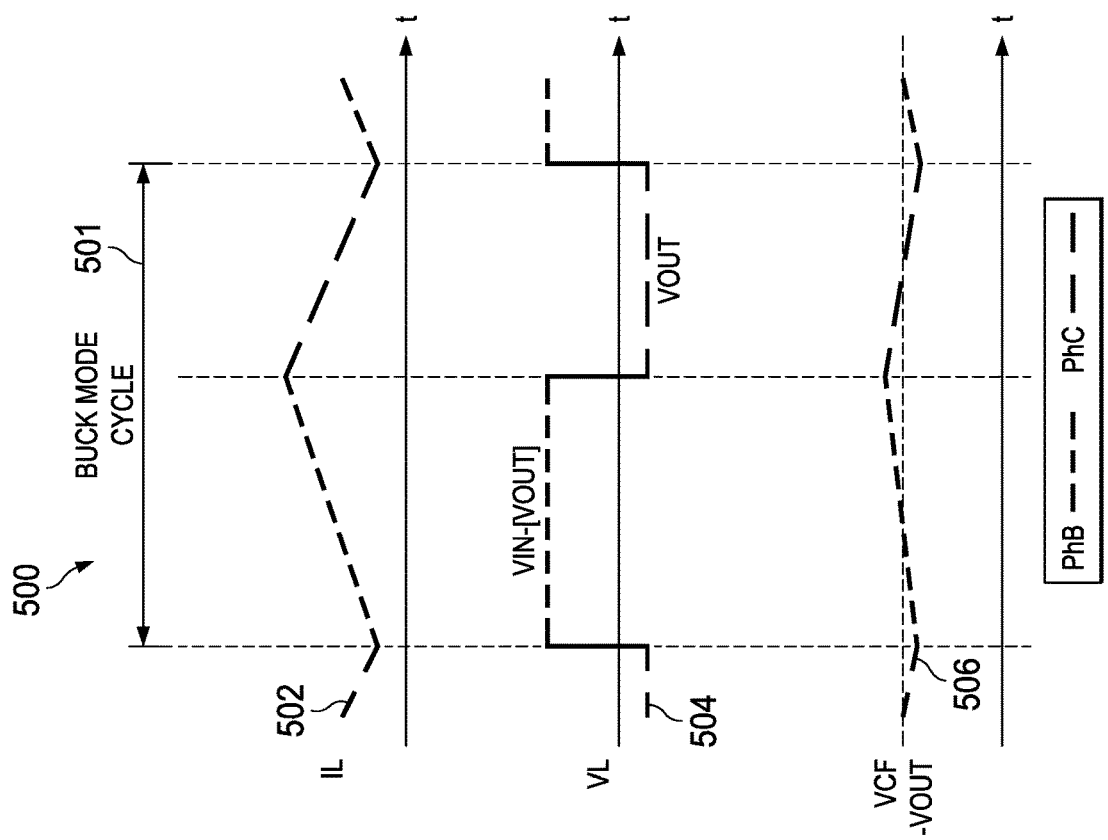
FIG. 5 is a graph of inductor current, inductor voltage, and flying capacitor voltage signals over an example converter cycle during buck mode operation of the buck-boost converter of FIG. 1.

Referring now to FIGS. 4 and 5, FIG. 4 shows operation of the single-ended buck-boost converter 100 in the first mode (BUCK), with dashed lines showing the current flow paths during buck mode phases designated as PhB and PhC. The switching circuit M1-M5, 120 operates in a first mode BUCK to alternate between first and second buck mode phases PhB and PhC for buck operation when the input voltage signal VIN is greater than the output voltage absolute value |VOUT|. In the first buck mode phase PhB, the control circuit 120 asserts the control signals on the outputs 121 and 124 (e.g., active high) to turn the transistors M1 and M4 on, and provides appropriate control signals (e.g., low) on the outputs 122, 123 and 125 to turn the transistors M2, M3 and M5 off. This connects the inductor L and the capacitor CF in series between the input node 102 and the reference node 106, providing a charge current flow path designated PhB in FIG. 4 from the input voltage signal VIN through the inductor L and the flying capacitor CF in order to charge the inductor L and the capacitor CF. In the first buck mode phase PhB, the average capacitor voltage VCF is approximately |VOUT|, and the inductor voltage VL is approximately VIN−|VOUT|.

In the second buck mode phase PhC, the control circuit 120 provides switching control signals at the outputs 121-125 to turn M2, M3 and M5 on, and to turn M1 and M4 off. The dashed line current flow path designated PhC in FIG. 4 illustrates operation in this state, where the inductor L and the capacitor CF are connected in parallel between the first output node 104 and the reference node 106. In this phase, moreover, the inductor L and the capacitor CF are at least partially discharged to deliver power to the first output node 104. In the second buck mode phase PhC, the capacitor voltage VCF is approximately equal to |VOUT|, and the inductor voltage is approximately |VOUT|. The control circuit 120 alternates between the first and second buck mode phases PhB and PhC in this manner, and controls the duty cycle in closed loop fashion according to one or more of the feedback signals or values in order to regulate the output voltage signal VOUT when VIN>|VOUT|. In this example, the ratio of the output voltage to the input voltage in buck mode operation is given by the following equation VOUT/VIN=−Db, where Db is the on-time duty cycle ratio of the operation in the first buck mode phase PhB during each converter cycle, and the converter cycles have a temporal duration of Tsw.

FIG. 5 illustrates a graph 500 including an inductor current curve 502 (IL), an inductor voltage curve 504 (VL), and a capacitor voltage curve 506 over an example converter cycle 501 (BUCK MODE CYCLE) during the first mode (BUCK) in the buck-boost converter 100. The illustrated cycle 502 begins with PhB and concludes with operation in the phase PhC. As seen in FIG. 5, the inductor current IL (curve 502) increases and the capacitor voltage VCF (curve 506) increases during the first phase PhB, and the inductor voltage (curve 504) is approximately VIN−|VOUT|. During the second buck mode phase PhC, the inductor current IL and the capacitor voltage VCF decrease as the load is provided with power, and the inductor voltage is approximately equal to VOUT. The control circuit 120 implements a series of these alternating phases in a generally continuous sequence of converter cycles for operation in the first mode. The control circuit 120 also implements mode switching between the first mode and the second mode, and certain implementations include operation in a third mode for buck-boost control using three phases as discussed further below.

Figure 7:
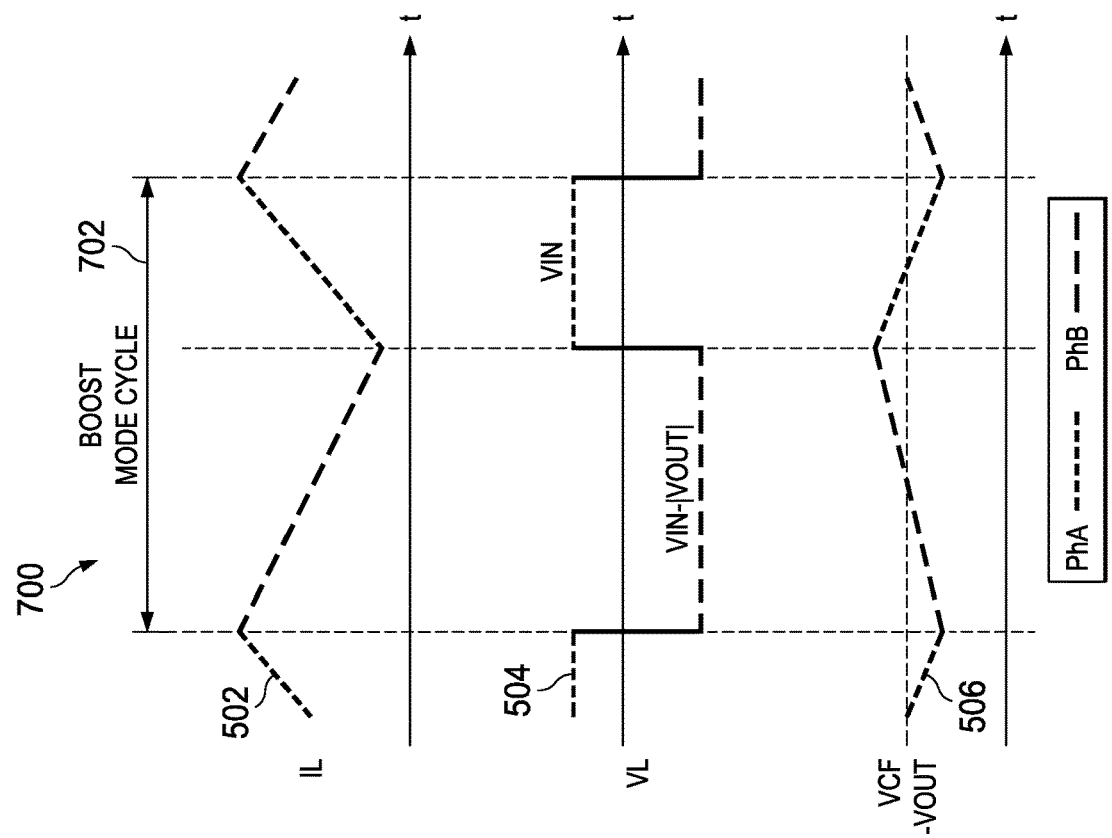
FIG. 7 is a graph of inductor current, inductor voltage, and flying capacitor voltage signals over an example converter cycle during boost mode operation of the buck-boost converter of FIG. 1.
Figure 6:
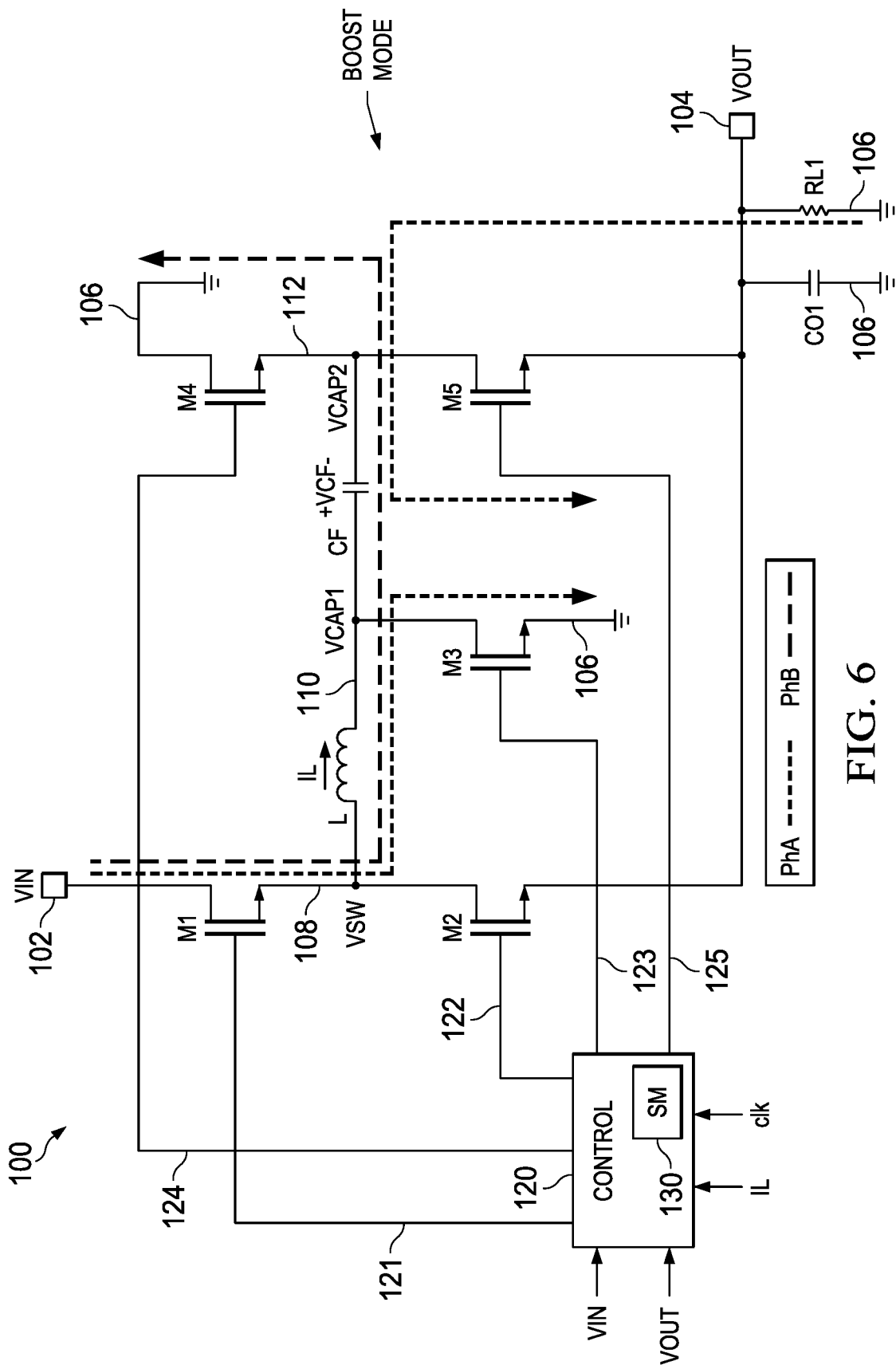
FIG. 6 is a schematic diagram of the buck-boost converter of FIG. 1 alternating between two boost mode phases.

Referring now to FIGS. 6 and 7, the control circuit 120 implements operation in the second mode (BOOST) when VIN<|VOUT|. FIG. 6 shows the buck-boost converter 100 alternating between first and second boost mode phases PhB and PhA, where the switch states of the first boost mode phase PhB are the same as are used in the first buck mode phase described above. In particular, the control circuit 120 provides the control signals at the outputs 121-125 in the first boost mode phase PhB to turn M1 and M4 on and to turn M2, M3 and M5 off. This connects the inductor L and the capacitor CF in series between the input node 102 and the reference node 106, where the current flow path for this phase is designated PhB in FIG. 6. This switching circuit state discharges the inductor L and charges the capacitor CF.

FIG. 7 shows a graph 700 including an inductor current curve (IL) 502, an inductor voltage curve (VL) 504, and a capacitor voltage curve (VCF) 506 over an example boost mode converter cycle 702. In the boost mode, the capacitor voltage is increased in the first phase PhB by charging using current flow IL from the inductor L. During this phase, moreover, the inductor voltage VL (curve 504 in FIG. 7) is approximately VIN In the second boost mode phase PhA, the control circuit 120 provides the switching control signals to turn M1, M3 and M5 on, and to turn M2 and M4 off. Turning on M1 and M3 connects the inductor L between the input node 102 and the reference node 106 to charge the inductor L. In addition, turning on M3 and M5 connects the capacitor CF between the first output node 104 and the reference node 106 to discharge the capacitor CF and deliver power to the first output node 104. The current flow paths for the second boost mode phase are designated as PhA in FIG. 6. As seen in the graph 700 of FIG. 7, the inductor current IL increases during the second boost mode phase PhA (curve 502). In addition, the capacitor voltage VCF decreases as the capacitor CF delivers the output current IOUT to the output node 104 and the second boost mode phase. As shown in the curve 506 of FIG. 7, moreover, the average capacitor voltage VCF during the boost mode operation is approximately equal to −VOUT. During this phase, moreover, the inductor voltage VL (curve 504) is approximately equal to VIN. The ratio of the output voltage to the input voltage in the boost mode operation is given by the following equation VOUT/VIN=−1/(1−Da), where Da is the on-time duty cycle ratio of the operation in the second boost mode phase PhA during each converter cycle. In this example, moreover, M1 is permanently on and M2 is permanently off in phase PhA and phase PhB in the boost. This further reduces the switching losses.

Figure 8:
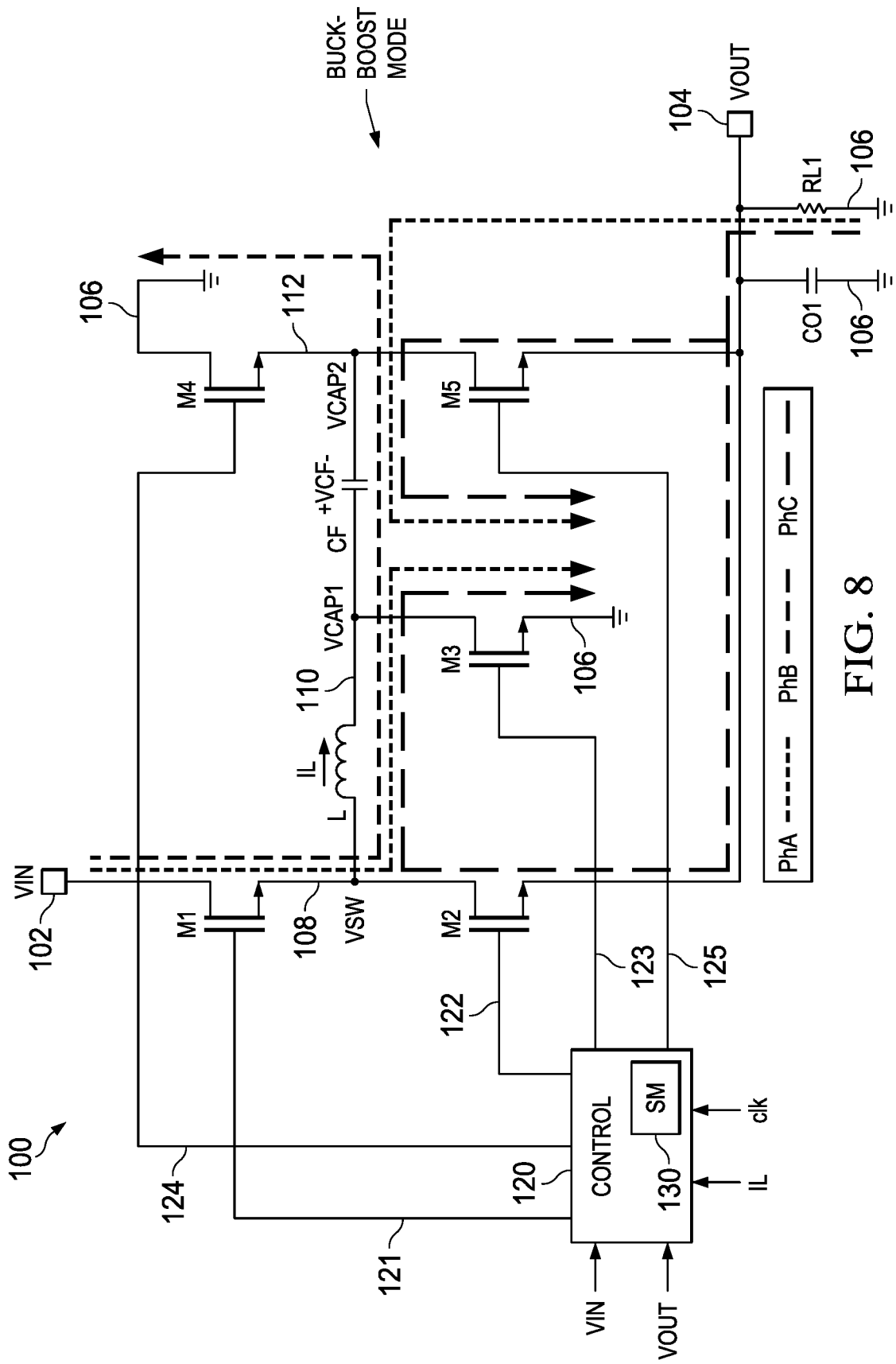
FIG. 8 is a schematic diagram of the buck-boost converter of FIG. 1 alternating between three buck-boost mode phases.
Figure 9:
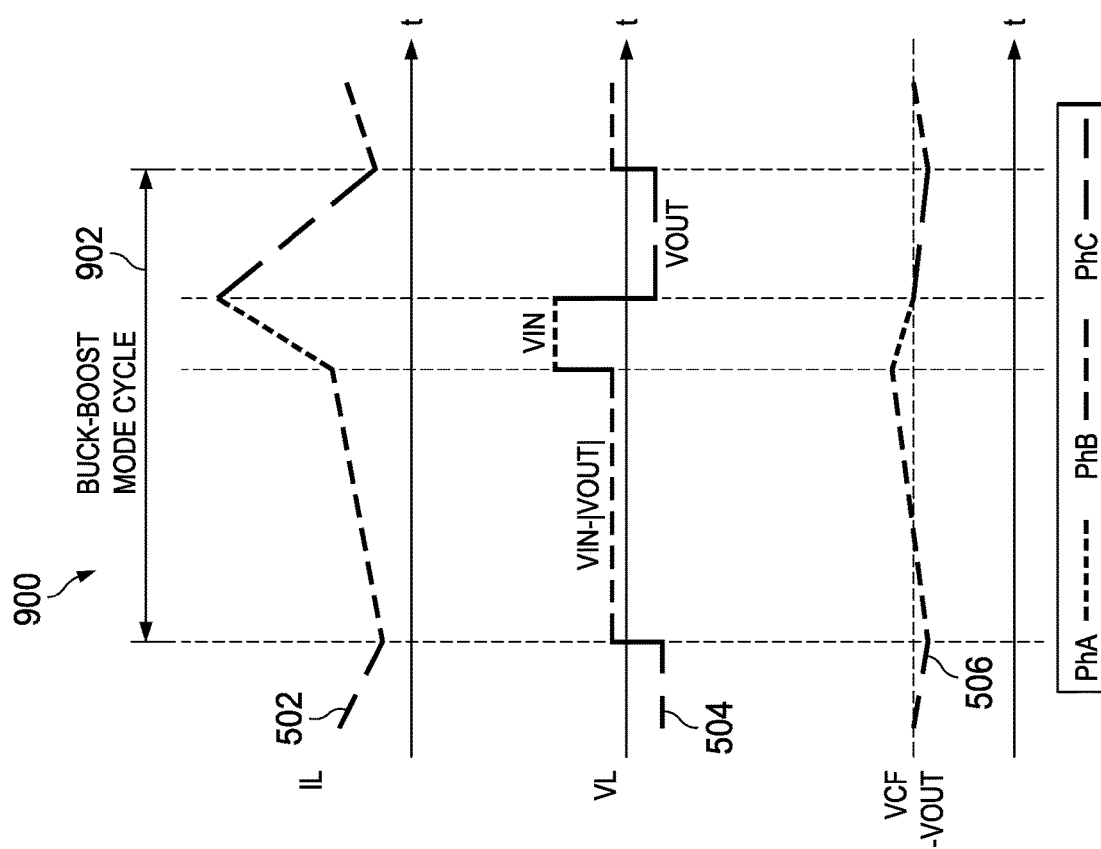
FIG. 9 is a graph of inductor current, inductor voltage, and flying capacitor voltage signals over an example converter cycle during buck-boost mode operation of the buck-boost converter of FIG. 1.

FIGS. 8 and 9 illustrate a third operating mode (BUCK-BOOST) implemented by the control circuit 120 when the input voltage VIN is approximately equal to −VOUT. In the third mode, the control circuit 120 generates the switching control signals at the outputs 121-125 to sequentially transition through first, second and third buck-boost mode phases PhB, PhA and PhC for buck-boost operation to change operation of the DC-DC converter circuit 100 between the first and second modes. The buck-boost operating mode, moreover, may include a single converter cycle or any number of converter cycles during which the three phase sequence is repeated. The control circuit 120 in one example implements the same switch states corresponding to the above-described phases PhB, PhA and PhC, although not a requirement of all possible implementations.

FIG. 8 illustrates the buck-boost converter circuit 100, and illustrates the corresponding current flow paths designated PhB, PhA and PhC corresponding to the first, second and third buck-boost mode phases implemented by the control circuit 120. FIG. 9 shows a graph 900 illustrating the inductor current and voltage curves 502 and 504, as well as the capacitor voltage curve 506 over an example converter cycle 902 during buck-boost mode operation of the circuit 100.

The control circuit 120 provides the switching control signals at the outputs 121-125 in the first buck-boost mode phase PhB to turn M1 and M4 on and to M2, M3 and M5 off. This connects the inductor L and the capacitor CF in series with one another between the input node 102 and the reference node 106. As seen in FIG. 9, the inductor L is charged and the capacitor CF is charged in the first buck-boost mode phase PhB, and the inductor voltage VL is approximately VIN−|VOUT|. As shown in the curve 506 of FIG. 9, the average capacitor voltage VCF is approximately equal to −VOUT throughout the buck-boost mode cycle 902. In the second buck-boost mode phase PhA, the control circuit 120 turns M1, M3 and M5 on and turns M2 and M4 off. This connects the inductor L between the input node 102 and the reference node 106 to charge the inductor L, and also connects the capacitor CF between the first output node 104 and the reference node 106 to discharge the capacitor CF to deliver power to the first output node 104. In the third buck-boost mode phase PhC, the control circuit 120 turns M2, M3 and M5 von and turns M1 and M4 off. This connects the inductor L and the capacitor CF in parallel between the first output node 104 and the reference node 106 to discharge the inductor L and the capacitor CF to deliver power to the first output node 104.

As described above, the buck-boost converter circuit 100 advantageously provides the ability to generate output voltages VOUT that are less than, approximately equal to, or greater than the input voltage VIN. The converter circuit 100, moreover, advantageously reduces the voltage stress on certain of the switching transistors M1-M5. As mentioned above, for example, both switching transistors in conventional dual-switch buck-boost converters experience voltages of approximately VIN+|VOUT|. In contrast, example voltage ratings for the illustrated buck-boost converter circuit 100 are as follows:

M1:2.1*VIN voltage rating
M2:VIN+|VOUT| voltage rating
M3, M4 and M5:>|VOUT| voltage rating Thus, only M2 needs to be sized according to the voltage amount VIN+|VOUT|. The reduced switching transistor sizes, in turn, reduces switching losses in the converter 100 compared with conventional designs. Furthermore, the converter inductor L is exposed to lower maximum voltages than was the case for conventional designs. The illustrated circuit 100 advantageously reduces the voltage stress on the inductor L, and also reduces the inductor ripple current levels compared with conventional buck-boost converters. These advantages lead to significantly improved converter efficiency, making buck-boost converters applicable to a larger number of potential applications.

Referring again to FIG. 2, the bipolar implementation achieves these same advantages, and provides a differential or bipolar output VOUT−, VOUT+ at the first and second output terminals 104, 204. In this example, the first output node 104 provides a first output voltage signal VOUT− that is negative relative to the voltage of the reference node 106, and the second output node 204 provides the second output voltage signal VOUT+ that is positive relative to the voltage of the reference node 106. The sixth transistor M6 is connected between the intermediate node 110 and the second output node 204, and is turned on in phase PhB and turned off in the phases PhA and PhC. In one example, the control circuit 120 provides a control signal to the gate of the transistor M6 via a corresponding output (not shown) to turn M6 on when the third transistor M3 is turned off, and to turn M6 off when M3 is turned on. In another possible example, the control circuit 120 turns M6 off before turning M1 and M4 off to accommodate situations where the energy consumption in VOUT+ is lower than in the negative output rail VOUT−. For the bipolar example of FIG. 2, example transistor voltage ratings are as follows:

M1:2.1*VIN voltage rating
M2:VIN+|VOUT| voltage rating
M3, M4, M5 and M6:|VOUT| voltage rating As seen above, the single-ended and bipolar implementations of the circuit 100 provide a 5 or 6 switch topology which can advantageously employ power switches with smaller voltage ratings. In addition, the circuit 100 operates the inductor L with reduced ripple current and higher ratio ILaverage/Iout of the average inductor current to the output current. In addition, the problem of high voltages across the power switches and the inductor is most severe with large magnitudes of the output voltage VOUT. As opposed to conventional designs, the disclosed buck-boost converter 100 advantageously operates at lower duty cycles for the same VIN/VOUT ratio compared to the standard topologies through intelligent mode selection by the control circuit 120. In particular, the converter 100 addresses the high-voltage problems with two different operational modes, including the first buck mode (when VIN>|VOUT|) and the second boost mode (when VIN<|VOUT|). As seen above, the duty cycles in the first and second modes are 50% or less. In addition, the control circuit 120 in certain examples advantageously provides for operation of the third (BUCK-BOOST) mode for changing between the first and second modes. This advantageously provides seamless transition between the inverting buck and inverting boost operation modes.

Figure 10:
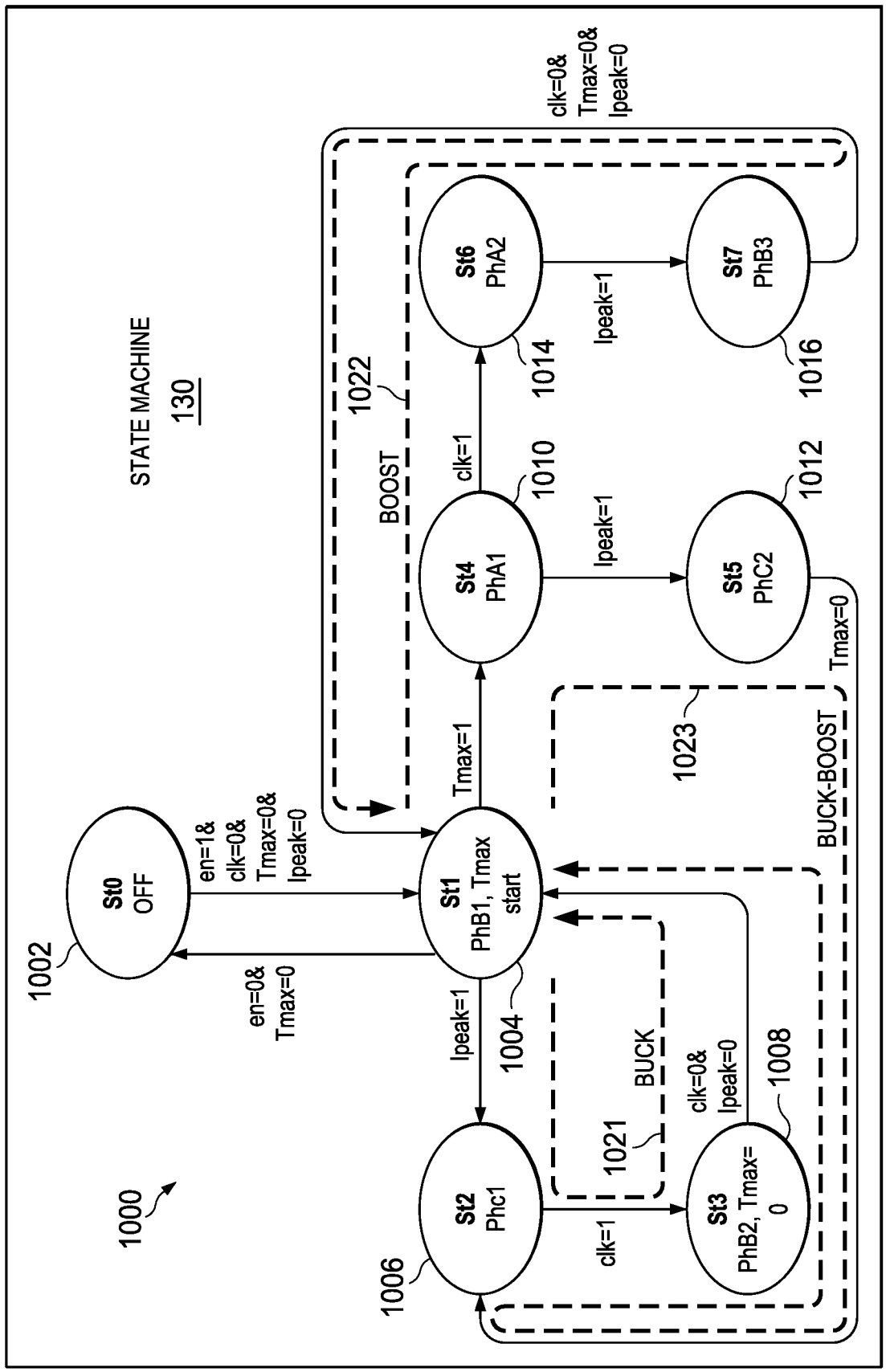
FIG. 10 is a state diagram of example operation of the control circuit in the buck-boost converter of FIG. 1 to implement a method for converting a DC input voltage signal to provide a DC output voltage signal using different buck, boost and buck-boost operating modes.

Referring now to FIGS. 10-17, the control circuit 120 in certain implementations includes a state machine 130, which can be implemented in any suitable circuitry, whether programmable or not. FIG. 10 provides a state diagram 1000 that illustrates example operation of the state machine 130 of the control circuit 120. The state diagram 1000 is used in certain examples to implement a method for converting a DC input voltage signal to provide a DC output voltage signal using different buck, boost and buck-boost operating modes as previously described. In one example, the state machine 130 switches between the first, second and third modes according to a feedback signal Ipeak and the clock signal clk. In one example, the inductor current feedback signal IL is received by the control circuit 120 and is provided as an input to a comparator (not shown). The comparator compares the inductor current signal IL with a threshold signal representing a predetermined peak value for the inductor current (Ipeak). The output of the comparator is used by the state machine 130 as a variable, where Ipeak can be =0 or =1 depending on the inductor current value measured at any given time. The state machine also receives an enable input "en", where an enable variable value of 0 indicates that the circuit is disabled, and an enable variable value of "1" indicates that the circuit is enabled. The state machine 130 also operates according to the clock signal clk, and a signal Tmax. In the illustrated implementation, the Tmax has a value of 0 before a predetermined time has elapsed within a given converter cycle, and once the predetermined time has elapsed within the converter cycle, the variable Tmax has a value of 1. In one example, Tmax is (0.8 or 0.9)*Tsw, and the switching cycle period Tsw starts with a rising edge of the clk signal.

The state machine operation begins in FIG. 10 at state 1002 (St0) when the circuit is off (en=0). Once the circuit 100 is enabled, the state machine 130 moves to the state 1004 (SU). The state transitions thereafter follow different paths depending on the appropriate operating mode of the buck-boost converter 100. In particular, buck mode operation is designated by a dashed line 1021, boost mode operation is designated by a dashed line 1022, and buck-boost mode operation is designated by a dashed line 1023 in FIG. 10. As seen in the above description of the first, second and third modes, each mode begins with the phase PhB, shown as state 1004 in FIG. 10. Operation proceeds to the left to state 1006 (PhC) if the variable Ipeak=1 before the variable Tmax transitions to "1". This means that the inductor current reaches the predefined threshold peak value before the predefined amount of time since the beginning of the current converter cycle. If the converse is true (Tmax is set to "1" prior to Ipeak being set to "1"), control transfers from the state 1004 to the right to state 1010 (PhA) for boost mode operation. In the buck mode control path 1021, the state machine 130 transitions from the PhC state 1006 back to the PhB phase at state 1008, and thereafter returns for the next cycle when the clock signal clk=0 and Ipeak=0 back to the state 1004.

For boost mode operation, the cycle begins at the state 1004, and transitions when Tmax=1 to the state 1010 for operation in the boost mode phase PhA. From the state 1010, control proceeds along the boost transition path 1022 if the next clock signal (clk=1) is received prior to the circuit reaching the peak inductor current (Ipeak=1). In this case, control is transferred to continue the PhA phase operation at state 1014. In this case, once the Ipeak variable then reaches "1", the state machine 130 transitions to the PhB boost mode phase at state 1016. The control circuit 120 then returns to the state 1004 when clk=0, Tmax=0 and Ipeak=0.

The state machine 130 can enter the buck-boost mode path 1023 from the PhA state 1010 if the peak current is reached (Ipeak=1) before the next clock signal (e.g., before clk=1). In this case, the state machine transitions to the state 1012 to begin the phase PhC operation. The phase PhC in this case continues with transition to the state 1006 when Tmax=0, and the control circuit transitions to the phase PhB operation at the state 1008 and then the state 1004 as described above. As seen in the state diagram 1000 of FIG. 10, the control circuit 120 implements the state machine 130 in order to selectively operate in one of the three modes according to the feedback signal IL and the clock signal clk.

Figure 11:
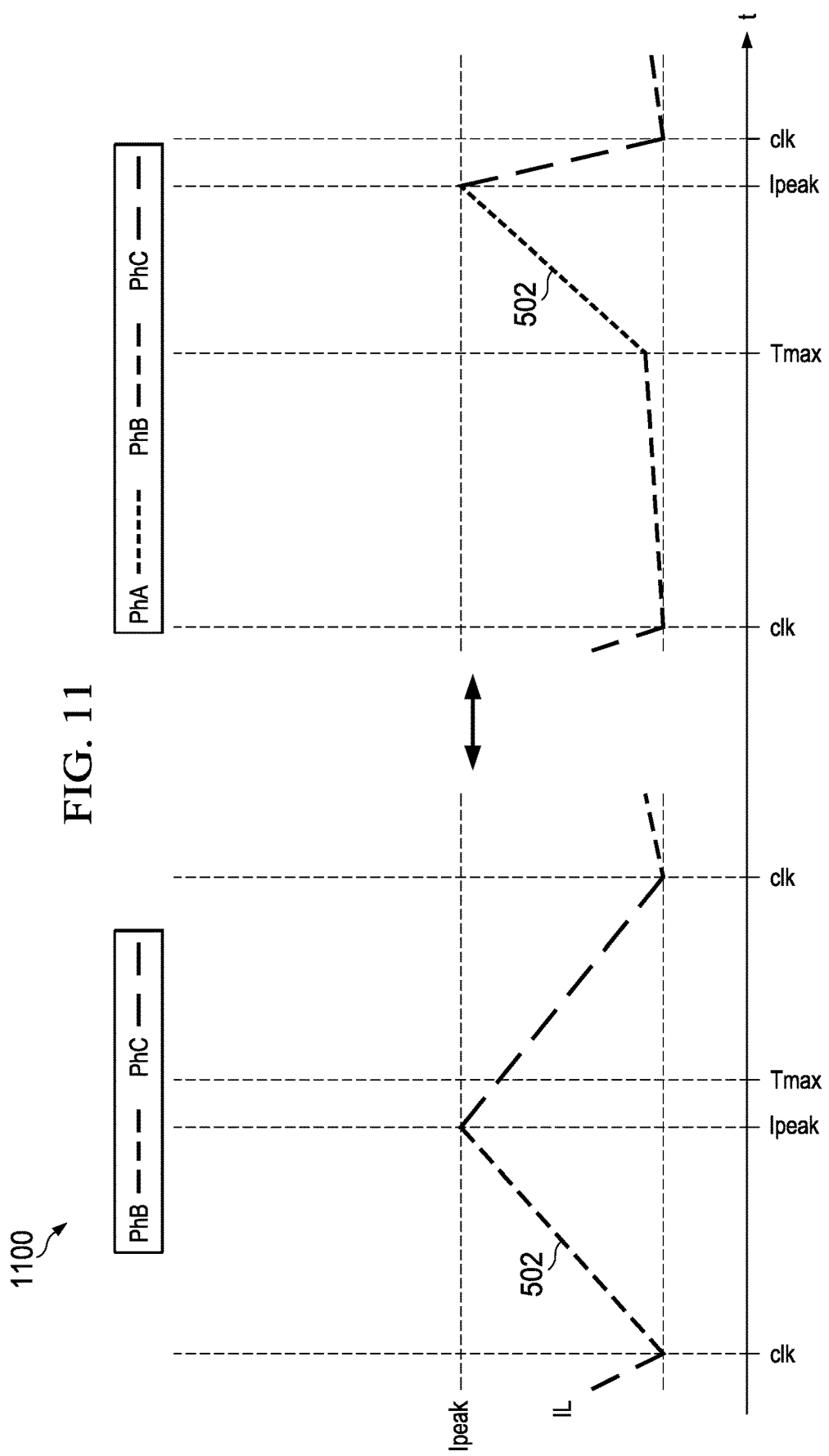
FIG. 11 is a graph of an inductor current waveform and transition from buck mode operation to buck-boost mode operation in the buck-boost converter of FIG. 1.
Figure 12:
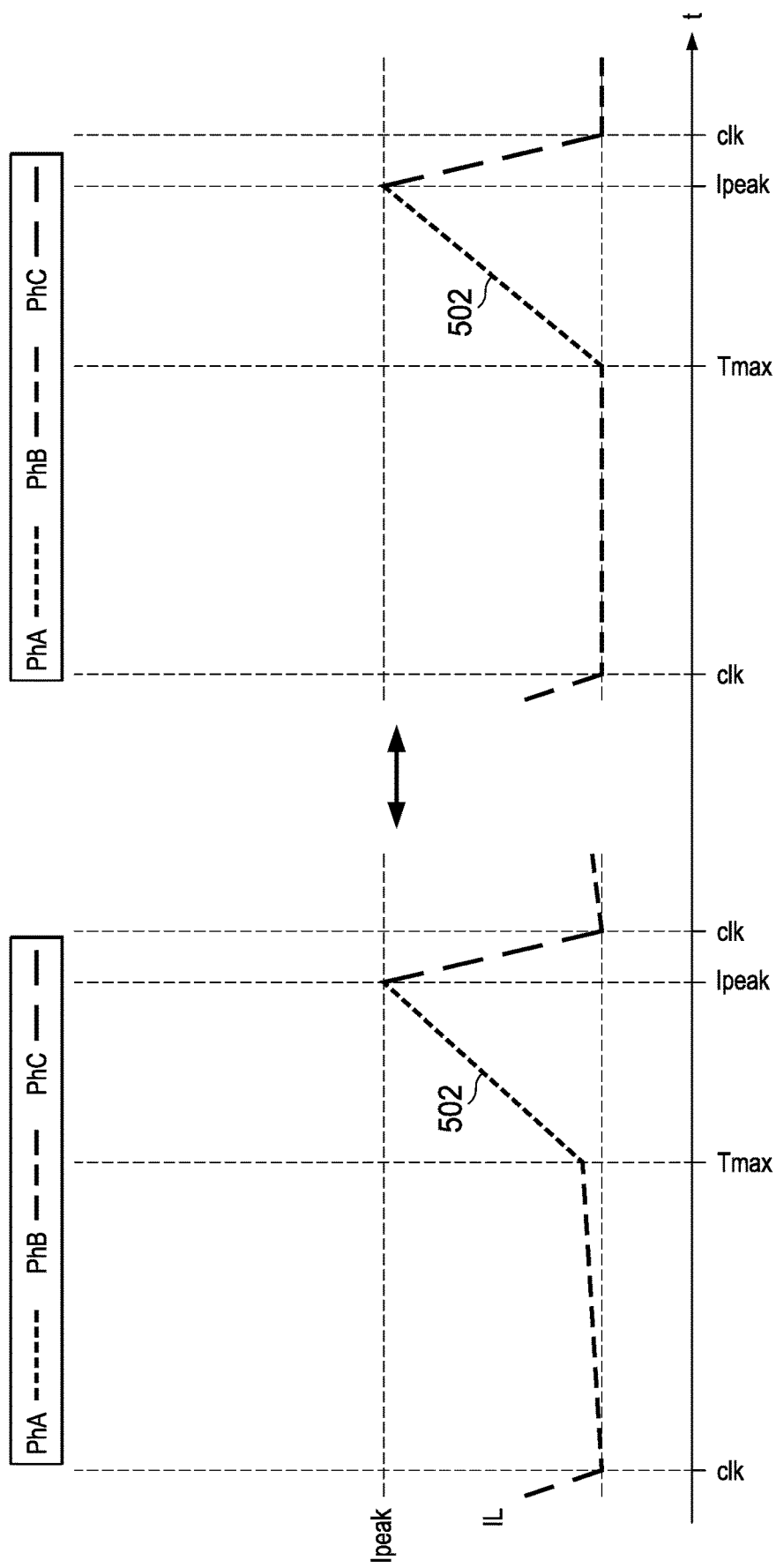
FIG. 12 is a graph of inductor current for two example converter cycles in buck-boost mode operation of the converter of FIG. 1.
Figure 13:
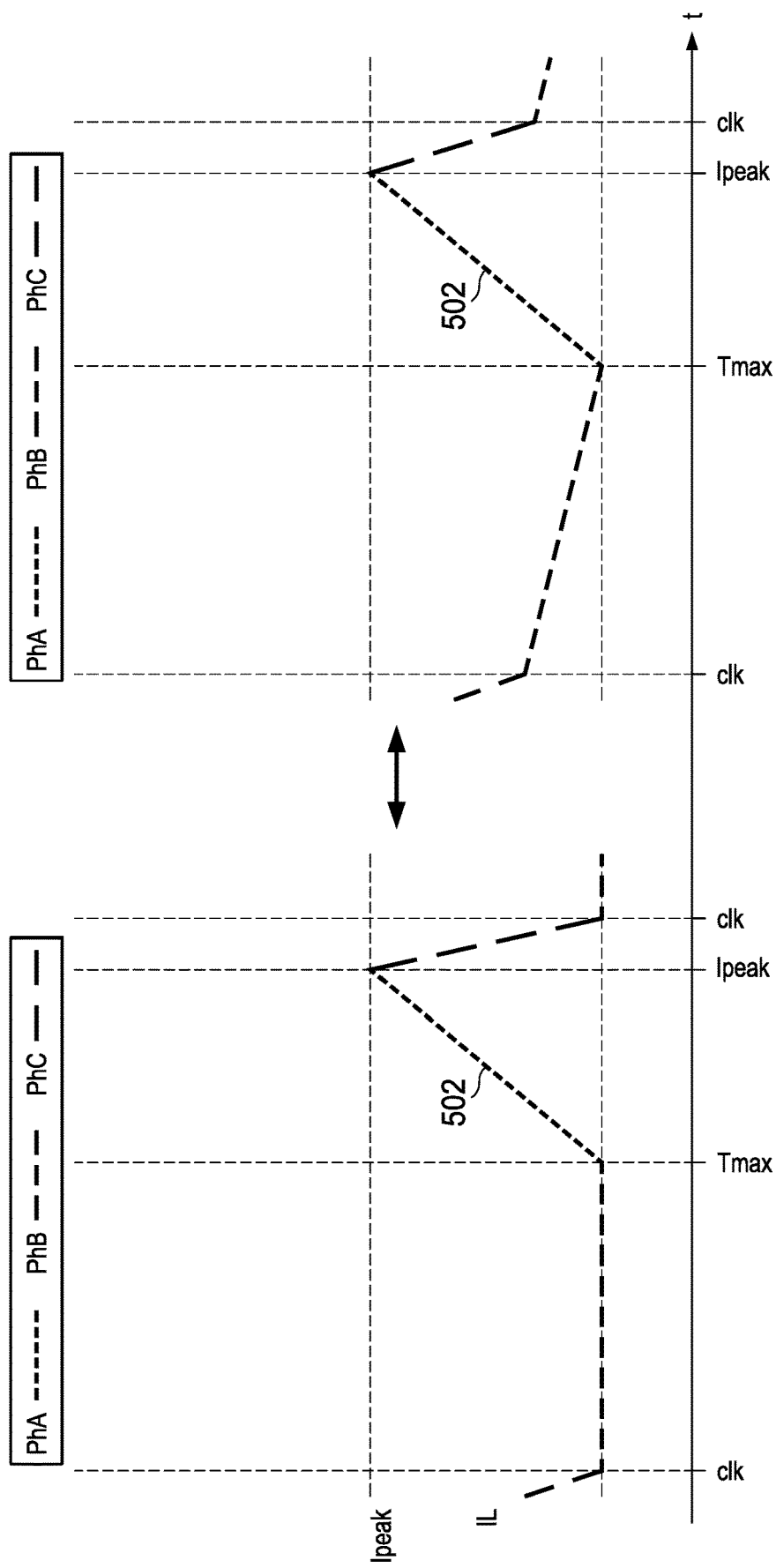
FIG. 13 is a graph of inductor current for two further example converter cycles in the buck-boost mode operation of the converter of FIG. 1.
Figure 14:
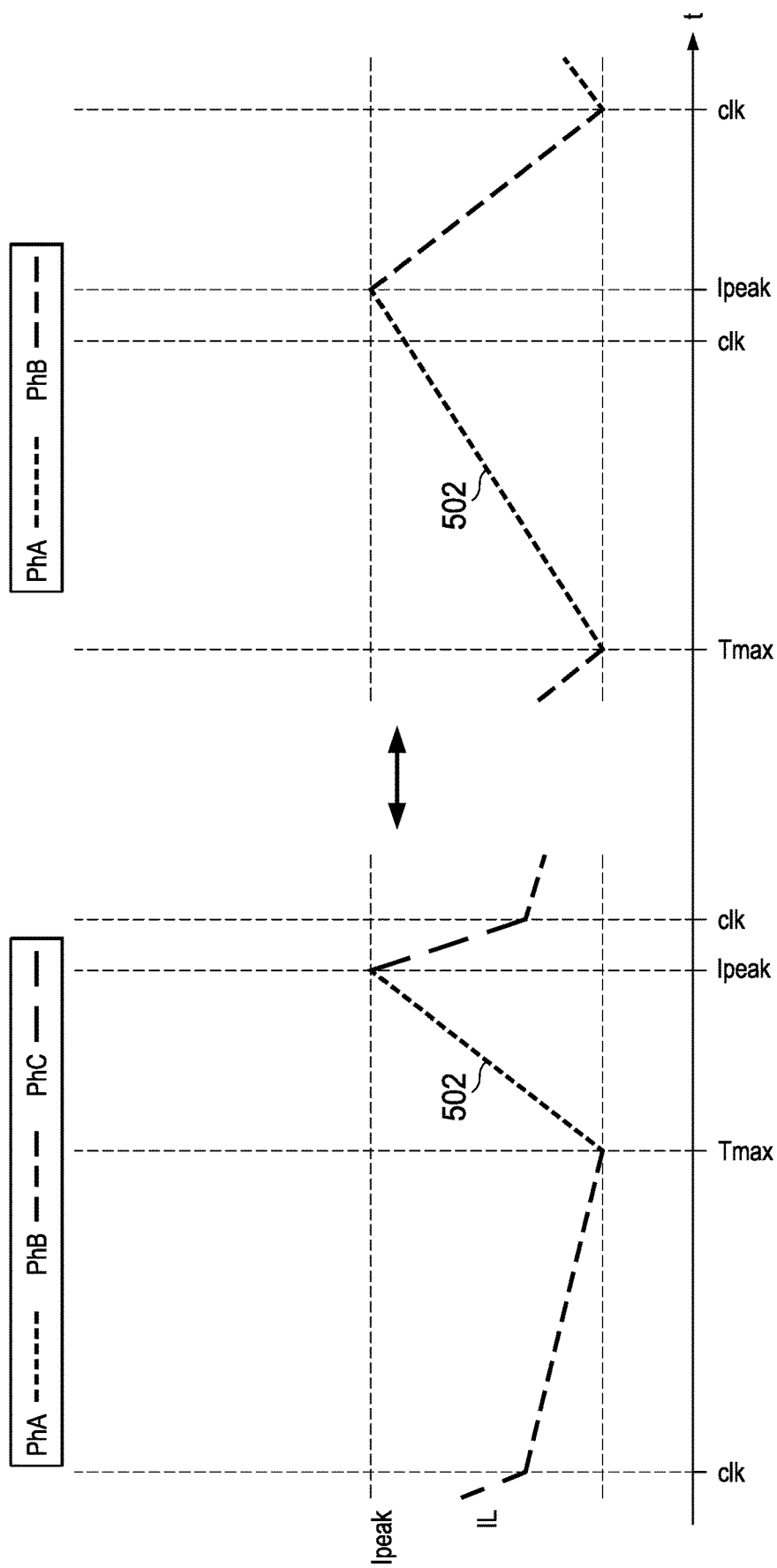
FIG. 14 is a graph of inductor current for two example converter cycles, including transitioning from buck-boost mode operation to boost mode operation of the converter of FIG. 1.

FIGS. 11-14 illustrate inductor current signal waveforms as the control circuit 120 transitions through the various operational modes in the circuit 100. FIG. 11 provides a diagram 1100 that shows the inductor current curve 502 for an example buck mode cycle on the left (path 1021 in FIG. 10), followed by a subsequent transition to the three phase buck-boost mode cycle on the right (path 1023 in FIG. 10). FIG. 12 shows a diagram 1200 indicating continued buck-boost mode operation for two example converter cycles, and a diagram 1300 in FIG. 13 illustrates additional example buck-boost mode converter cycles in the circuit 100. FIG. 14 shows another buck-boost mode cycle (on the left), and subsequent transition to the boost mode (path 1022 in the state diagram of FIG. 10). As seen in FIGS. 11 through 14, the relative timing of the clock signal and the point at which the inductor current IL reaches the peak value Ipeak determines whether the state machine receives the Ipeak=1 transition before or after the Tmax signal transitions to "1" within a given converter cycle. In the illustrated example of FIGS. 11-14, the relative timing between Ipeak=1 and Tmax gradually increases until the peak current has not been reached by the time the next converter cycle begins (e.g., on the right in FIG. 14). At this point, the control circuit 120 transitions out of the buck-boost mode and into the boost mode operation (path 1022 in FIG. 10).

Figure 15:
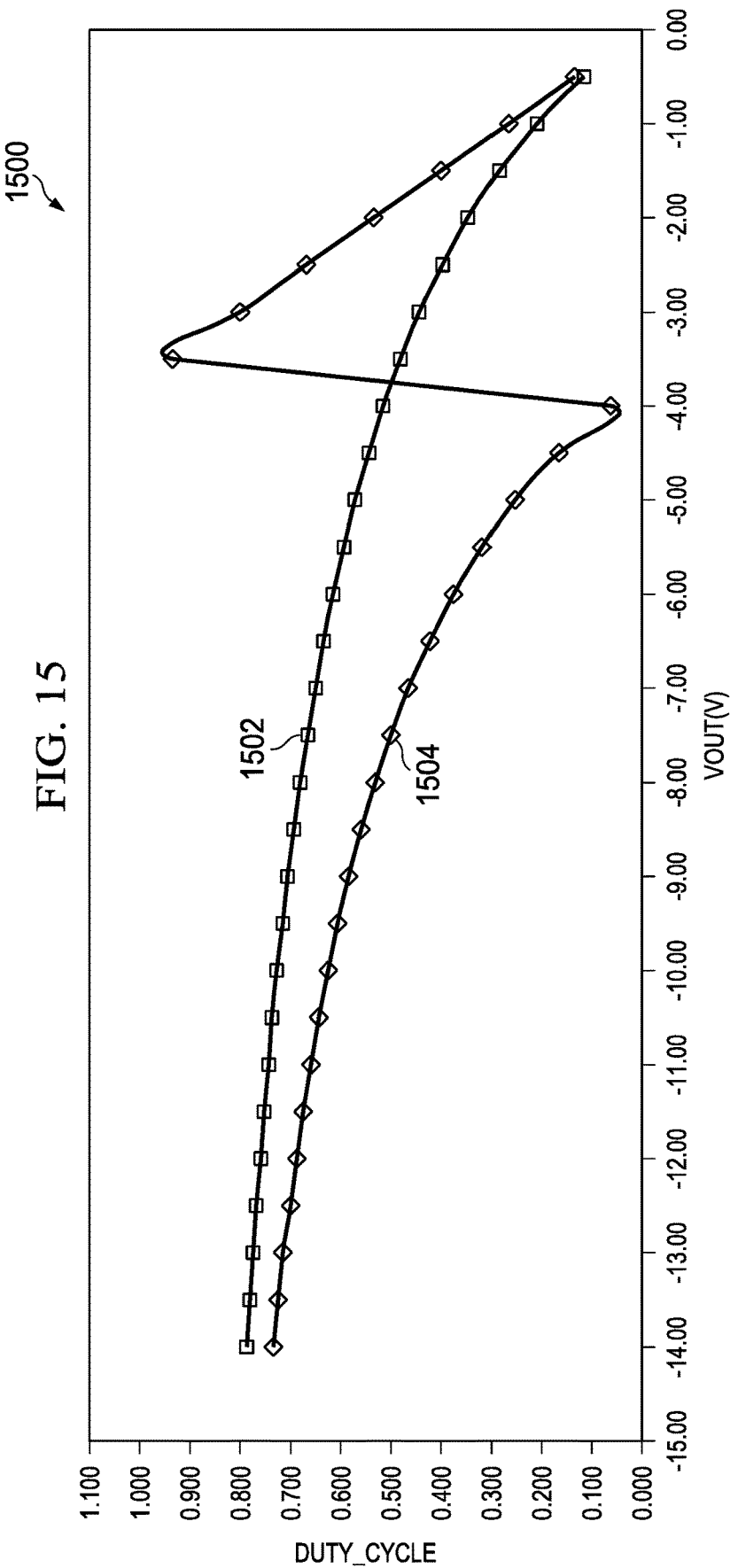
FIG. 15 is a graph of duty cycle as a function of output voltage for a standard buck-boost converter and the converter of FIG. 1.
Figure 16:
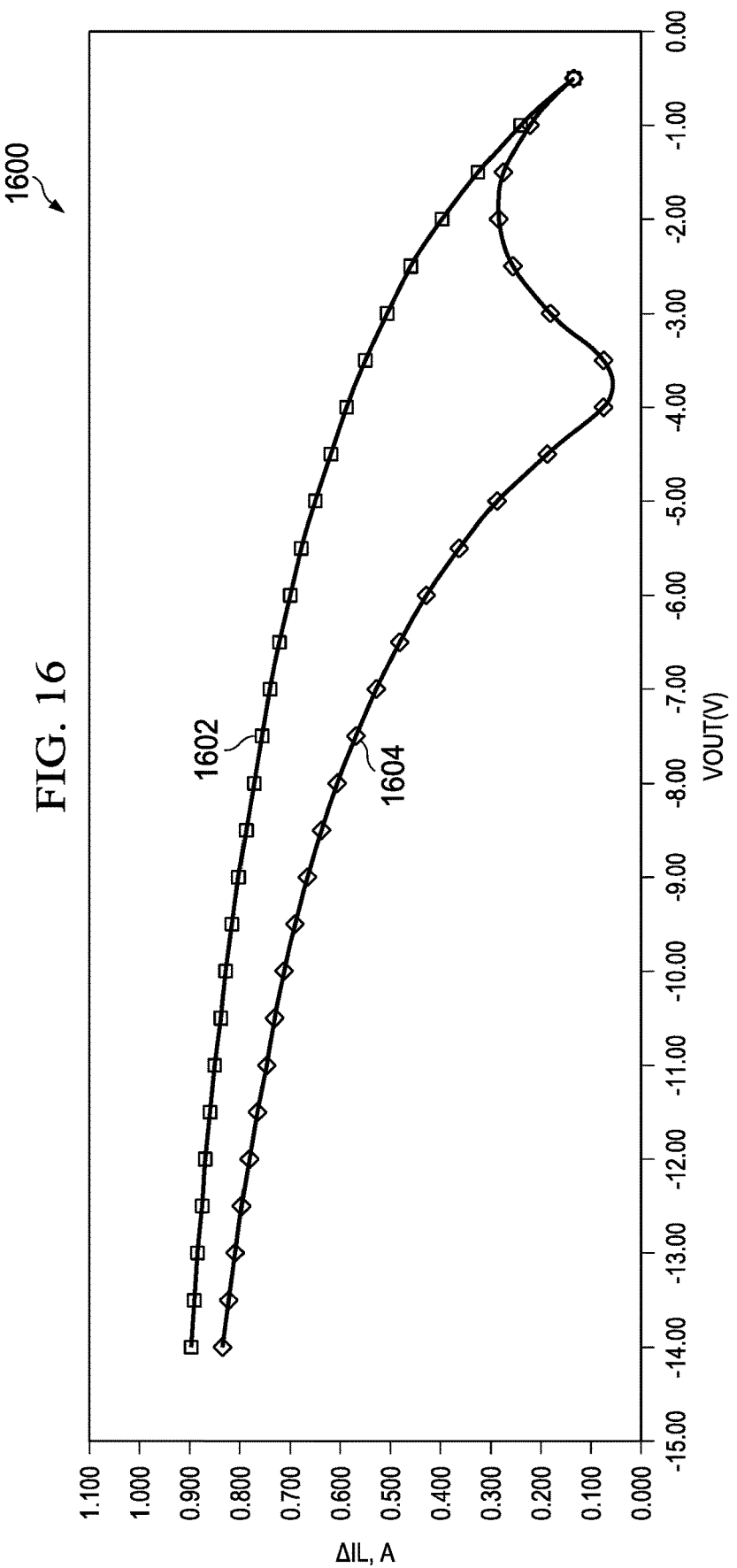
FIG. 16 is an example graph of inductor current change as a function of output voltage for the converter of FIG. 1 in comparison to an alternative buck-boost converter.
Figure 17:
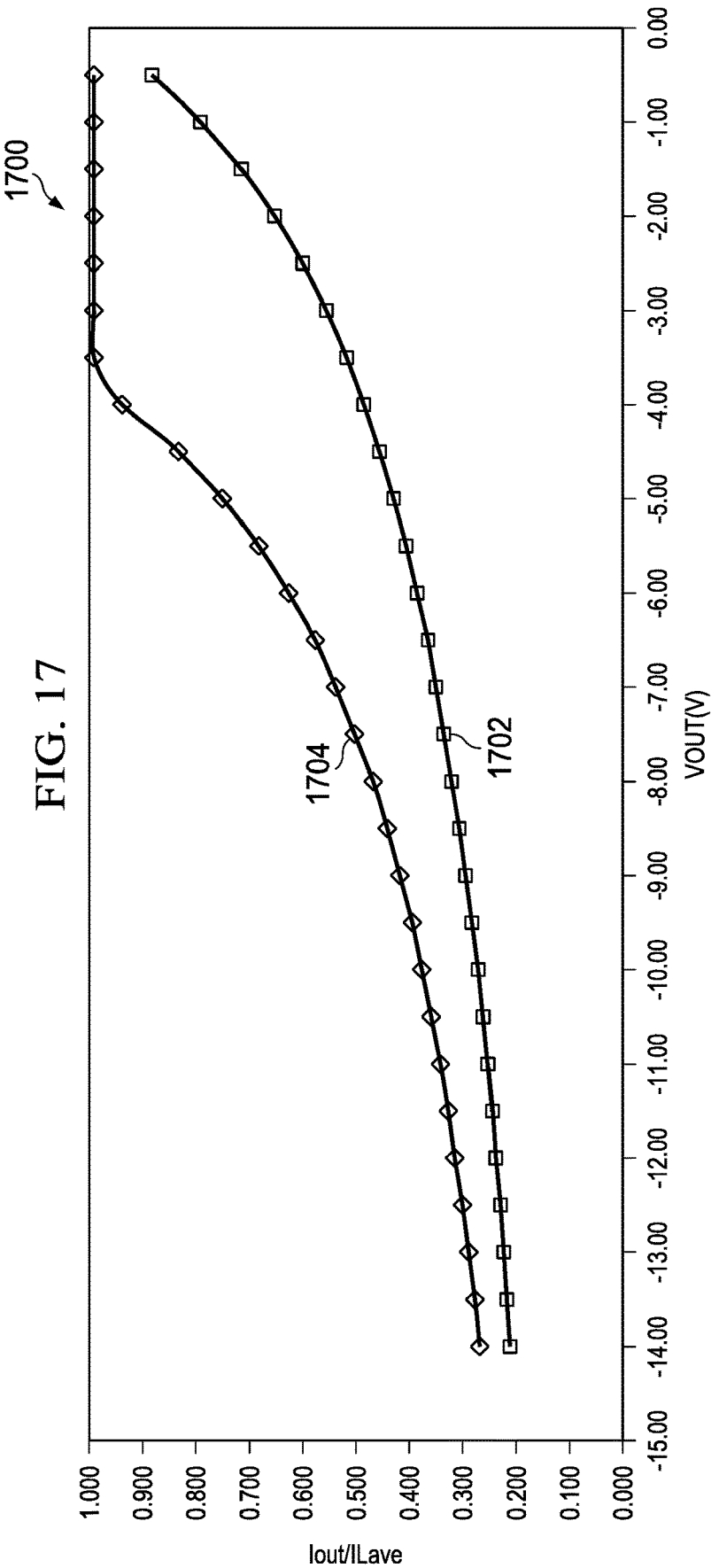
FIG. 17 is an example graph of output current to average inductor current ratio as a function of output voltage for the converter of FIG. 1 in comparison to an alternative buck-boost converter.

FIGS. 15-17 show comparative simulation results for a conventional two switch buck-boost converter and the buck-boost converter 100 of FIG. 1 for an input voltage VIN of 3.75 volts. A graph 1500 in FIG. 15 illustrates a graph 1500 showing duty cycle as a function of the output voltage VOUT, including a curve 1502 for a conventional two switch buck-boost converter and a curve 1504 for the buck-boost converter 100 of FIG. 1. The duty cycle performance of the converter 100 is significantly lower for boost operation above approximately −4.00 V and for buck-boost operation between −4.0 V and −4.2 V. For output voltages VOUT below approximately 3.6 V, the duty cycle drops from approximately 0.93 to less than 0.20 as the VOUT approaches −0.5V. FIG. 16 shows a graph of ΔIL as a function of the VOUT, including a curve 1602 for a conventional two switch buck-boost converter and a curve 1604 for the buck-boost converter 100. The curve 1604 demonstrates a significant reduction in the inductor current change ΔIL compared with the conventional converter. FIG. 17 shows an IOUT/ILAVG vs. VOUT graph 1700 including a curve 1702 for a conventional two switch buck-boost converter and a curve 1704 for the buck-boost converter 100 of FIG. 1. The new design 100 provides improved efficiency with a significantly higher output current to inductor current ratio IOUT/ILAVG as shown in the curve 1704.

Disclosed examples provide many advantages over conventional buck-boost converters, including reduced voltage ratings of at least some of the power switches and reduced voltage swing on the inductor L compared to a standard inverting buck boost topology. In addition, the converter 100 provides automatic reset of the CF bias voltage to the output signal VOUT, and the novel use of the flying capacitor CF provides a voltage source with the average VCF approximately equal to |VOUT|. The negative voltage capacitor node 112 node sees only CF and not the inductor L, which leads to little or no overshoots or undershoots on the voltage at the node 112, thereby reducing the risk of circuit latchup. The converter design 100 also facilitates the use of a smaller inductor size for the same VIN/VOUT ratio, as well as higher efficiency, particularly for large |VOUT|/VIN ratios. Moreover, the converter 100 can be expanded with a sixth switch M6 as shown in FIG. 2 for a bipolar split supply topology to generate symmetrical positive and negative output voltages, which can be beneficial for amplitudes modulated organic LED (OLED) power supplies. In addition, the converter 100 significantly reduces the inductor voltage VL and facilitates reduced peak inductor currents, the use of a smaller inductor L and lowered inductor resistive losses to support of higher load currents and the use of peak current control. These benefits lead to improved peak efficiency, particularly in boost mode operation. Moreover, the converter 100 provides better bandwidth, transient response and stability along with easier compensation by moving the right half plane zero to a slightly higher frequency compared to conventional buck-boost converters.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

What is claimed is:

1. A voltage converter comprising:
   an input terminal;
   an output terminal;
   a first switching node adapted to be coupled to an inductor;
   a second switching node adapted to be coupled to a capacitor;
   an intermediate node adapted to be coupled between the inductor and the capacitor;
   a first transistor coupled between the intermediate node and a ground reference node;
   a second transistor coupled between the ground reference node and the second switching node;
   a third transistor coupled between the second switching node and the output terminal; and
   a controller configured to:
   turn on the second transistor and turn off the first and third transistors during a first phase;
   turn off the second transistor and turn on first and third transistors during a second phase; and
   switch between the first and second phases based on a sense signal coupled to and indicative of a current conducted by the inductor.

2. The voltage converter of claim 1, in which the input terminal is coupled to the first switching node.

3. The voltage converter of claim 2, including:
   a second output terminal; and
   a fourth switch coupled between the intermediate node and the second output terminal.

4. The voltage converter of claim 1, including:
   a fourth transistor coupled between the input terminal and the first switching node; and
   a fifth transistor coupled between the first switching node and the output terminal.

5. The voltage converter of claim 4, in which: the first, second, and third transistors each has a first transistor size based on an absolute output voltage rating associated with the output terminal; the fourth transistor has a second transistor size based on an input voltage rating associated with the input terminal; and the fifth transistor has a third transistor size based on a sum of the input voltage rating and the absolute output voltage rating.

6. The voltage converter of claim 4, including:
   a controller operative in a boost mode and configured to:
   turn on the fourth and second transistors and turn off the first, third, and fifth transistors during a first phase;
   turn on the fourth, first, and third transistors and turn off second and fifth transistors during a second phase; and
   switch between the first and second phases based on a sense signal coupled to and indicative of a current conducted by the inductor.

7. The voltage converter of claim 4, including:
   a controller operative in a buck mode and configured to:
   turn on the fourth and second transistors and turn off the first, third, and fifth transistors during a first phase;
   turn off the fourth and second transistors and turn on first, third, and fifth transistors during a second phase; and
   switch between the first and second phases based on a sense signal coupled to and indicative of a current conducted by the inductor.

8. The voltage converter of claim 4, including:
   a controller operative in a buck-boost mode and configured to:
   turn on the fourth, first, and third transistors and turn off second and fifth transistor during a first phase;
   turn on the fourth and second transistors and turn off the first, third, and fifth transistors during a second phase;
   turn on first, third, and fifth transistors and turn off the fourth and second transistors during a third phase; and
   switch between the first, second, and third phases based on a sense signal coupled to and indicative of a current conducted by the inductor.

9. The voltage converter of claim 1, including:
   the inductor coupled between the first switching node and the intermediate node; and
   the capacitor coupled between the intermediate node and the second switching node.

10. The voltage converter of claim 1, including:
an integrated circuit having the first and second switching nodes, the intermediate node, and the first, second, and third transistors;
the inductor coupled between the first switching node and the intermediate node; and
the capacitor coupled between the intermediate node and the second switching node.

11. An integrated circuit comprising: an input terminal; an output terminal; a first switching node adapted to be coupled to an inductor; a second switching node adapted to be coupled to a capacitor; an intermediate node adapted to be coupled between the inductor and the capacitor; a first transistor coupled between the intermediate node and a ground reference node; a second transistor coupled between the ground reference node and the second switching node; a third transistor coupled between the second switching node and the output terminal a fourth transistor coupled between the input terminal and the first switching node; a fifth transistor coupled between the first switching node and the output terminal; and the first, second, and third transistors each has a first transistor size based on an absolute output voltage rating associated with the output terminal; the fourth transistor has a second transistor size based on an input voltage rating associated with the input terminal; and the fifth transistor has a third transistor size based on a sum of the input voltage rating and the absolute output voltage rating.

12. The integrated circuit of claim 11, including:
a controller operative in a boost mode and configured to:
turn on the fourth and second transistors and turn off the first, third, and fifth transistors during a first phase;
turn on the fourth, first, and third transistors and turn off second and fifth transistors during a second phase; and
switch between the first and second phases based on a sense signal indicative of a current conducted by the inductor.

13. The integrated circuit of claim 11, including:
a controller operative in a buck mode and configured to:
turn on the fourth and second transistors and turn off the first, third, and fifth transistors during a first phase;
turn off the fourth and second transistors and turn on first, third, and fifth transistors during a second phase; and
switch between the first and second phases based on a sense signal indicative of a current conducted by the inductor.

14. The integrated circuit of claim 11, including:
a controller operative in a buck-boost mode and configured to:
turn on the fourth, first, and third transistors and turn off second and fifth transistor during a first phase;
turn on the fourth and second transistors and turn off the first, third, and fifth transistors during a second phase;
turn on first, third, and fifth transistors and turn off the fourth and second transistors during a third phase; and
switch between the first, second, and third phases based on a sense signal indicative of a current conducted by the inductor.

15. The integrated circuit of claim 11, including:
the inductor coupled between the first switching node and the intermediate node; and
the capacitor coupled between the intermediate node and the second switching node.

16. A voltage converter comprising: an input terminal; an output terminal; an inductor; a capacitor coupled in series with the inductor at an intermediate node; a first transistor coupled between the intermediate node and a ground reference node; a second transistor coupled between the ground reference node and the capacitor; a third transistor coupled between the capacitor and the output terminal; a fourth transistor coupled between the input terminal and the inductor; a fifth transistor coupled between the inductor and the output terminal; the first, second, and third transistors each has a first transistor size based on an absolute output voltage rating associated with the output terminal; the fourth transistor has a second transistor size based on an input voltage rating associated with the input terminal; and the fifth transistor has a third transistor size based on a sum of the input voltage rating and the absolute output voltage rating.

* * * * *